United States Patent
Machida

(10) Patent No.: US 11,012,733 B2
(45) Date of Patent: May 18, 2021

(54) DEVICE CONTROLLER, COMPUTER READABLE STORAGE MEDIUM, AND REMOTE CONTROL SYSTEM

(71) Applicant: SMK Corporation, Tokyo (JP)

(72) Inventor: Yusuke Machida, Kanagawa (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 16/721,922

(22) Filed: Dec. 20, 2019

(65) Prior Publication Data
US 2020/0128289 A1    Apr. 23, 2020

Related U.S. Application Data

(63) Continuation of application No. PCT/JP2018/016693, filed on Apr. 18, 2018.

(30) Foreign Application Priority Data

Jul. 5, 2017  (JP) .............................. JP2017-132062

(51) Int. Cl.
*H04N 21/422* (2011.01)
*H04N 21/443* (2011.01)
*H04N 5/44* (2011.01)

(52) U.S. Cl.
CPC ......... *H04N 21/42225* (2013.01); *H04N 5/44* (2013.01); *H04N 21/4436* (2013.01)

(58) Field of Classification Search
CPC .................. H04N 21/43635; H04N 21/44227
See application file for complete search history.

(56) References Cited

U.S. PATENT DOCUMENTS

| | | | | |
|---|---|---|---|---|
| 7,043,691 B1 * | 5/2006 | Kwon | .................... | H04N 5/775 715/705 |
| 8,171,197 B2 * | 5/2012 | Pohlmann | ............. | H04L 43/103 710/109 |
| 8,286,210 B2 * | 10/2012 | Boyden | .................. | G09G 5/006 725/80 |
| 8,429,713 B2 * | 4/2013 | Candelore | .......... | H04N 21/4432 726/3 |
| 8,510,798 B2 * | 8/2013 | Candelore | ............ | H04N 7/1675 726/3 |
| 8,659,400 B2 * | 2/2014 | Arling | .................... | G08C 19/28 340/12.29 |

(Continued)

FOREIGN PATENT DOCUMENTS

| | | | |
|---|---|---|---|
| JP | 2008048137 A | 2/2008 | |
| JP | 2009207058 A | 9/2009 | |

(Continued)

OTHER PUBLICATIONS

International Preliminary Report on Patentability for International Application No. PCT/JP2018/016693, issued by the International Bureau of WIPO dated Jan. 7, 2020.

*Primary Examiner* — Brian P Yenke

(57) ABSTRACT

A device controller includes: a determination unit that determines an active device out of a first device including a plurality of ports connectable to a prescribed terminal and a second device connected to the first device through the ports; and a communication unit that transmits to a remote control device a control signal for allocating the active device determined by the determination unit to a device to be operated.

11 Claims, 17 Drawing Sheets

(56) References Cited

U.S. PATENT DOCUMENTS

| | | | | |
|---|---|---|---|---|
| 8,854,556 B2* | 10/2014 | Haughawout | H04N 5/445 | 348/734 |
| 9,350,850 B2* | 5/2016 | Pope | H04N 21/42221 | |
| 9,357,252 B2* | 5/2016 | Kohanek | H04N 21/43615 | |
| 9,380,248 B1* | 6/2016 | Wisniewski | H04N 21/41265 | |
| 9,390,618 B2* | 7/2016 | Ryu | H04N 21/4415 | |
| 9,432,608 B2* | 8/2016 | Kim | G08C 23/04 | |
| 9,478,125 B2* | 10/2016 | Arling | H04N 21/42204 | |
| 9,516,250 B2* | 12/2016 | Vanderhoff | H04N 21/42226 | |
| 9,842,492 B2* | 12/2017 | Arling | G08C 23/04 | |
| 9,942,603 B2* | 4/2018 | Kummer | H04N 21/42204 | |
| 10,231,027 B2* | 3/2019 | Kim | H04N 21/4622 | |
| 10,388,150 B2* | 8/2019 | Park | G08C 23/04 | |
| 10,593,195 B2* | 3/2020 | Owrang | G08C 17/02 | |
| 10,595,073 B2* | 3/2020 | Ashraf | H04N 21/42203 | |
| 10,721,430 B2* | 7/2020 | Oh | H04N 21/443 | |
| 10,728,626 B2* | 7/2020 | Arling | H04N 21/4345 | |
| 10,743,060 B2* | 8/2020 | Utsumi | H04N 21/4781 | |
| 10,803,735 B2* | 10/2020 | Ryu | H04N 21/42204 | |
| 2001/0052946 A1* | 12/2001 | Sato | H04N 21/47 | 348/706 |
| 2004/0066377 A1* | 4/2004 | Ha | G08C 19/28 | 345/169 |
| 2008/0247544 A1* | 10/2008 | Candelore | H04N 21/43632 | 380/241 |
| 2008/0310641 A1* | 12/2008 | Park | H04N 21/4882 | 381/59 |
| 2009/0219174 A1 | 9/2009 | Kikuchi | | |
| 2009/0248909 A1* | 10/2009 | Hironaka | H04N 21/47 | 710/18 |
| 2010/0321479 A1* | 12/2010 | Yang | H04N 13/398 | 348/51 |
| 2011/0032425 A1* | 2/2011 | Kamohara | H04N 5/765 | 348/553 |
| 2011/0047394 A1 | 2/2011 | Sato | | |
| 2011/0050387 A1* | 3/2011 | Kim | G06F 3/04817 | 340/3.1 |
| 2011/0157479 A1* | 6/2011 | Higuchi | H04N 21/43635 | 348/734 |
| 2011/0289113 A1* | 11/2011 | Arling | G08C 19/28 | 707/769 |
| 2012/0236161 A1* | 9/2012 | Kwon | H04N 21/485 | 348/207.99 |
| 2012/0249890 A1* | 10/2012 | Chardon | H04N 21/43615 | 348/734 |
| 2012/0319942 A1* | 12/2012 | Kim | H04N 21/436 | 345/156 |
| 2013/0057774 A1 | 3/2013 | Yoshida | | |
| 2013/0088332 A1* | 4/2013 | Park | H04N 21/42221 | 340/10.1 |
| 2014/0222862 A1* | 8/2014 | Arling | H04N 21/4222 | 707/769 |
| 2014/0270696 A1* | 9/2014 | Banks | H04N 21/42204 | 386/231 |
| 2014/0337879 A1* | 11/2014 | Arling | G08C 17/02 | 725/32 |
| 2015/0121434 A1* | 4/2015 | Shimizu | H04N 21/42225 | 725/80 |
| 2015/0172741 A1* | 6/2015 | Wyler | H04N 21/4222 | 386/231 |
| 2015/0281761 A1* | 10/2015 | Mank | H04L 12/282 | 725/37 |
| 2016/0066015 A1* | 3/2016 | Thissen | H04N 21/43615 | 725/74 |
| 2016/0191977 A1* | 6/2016 | Arling | H04N 21/4882 | 725/109 |
| 2017/0048577 A1* | 2/2017 | Chiou | G08C 23/04 | |

FOREIGN PATENT DOCUMENTS

| | | |
|---|---|---|
| JP | 2010004496 A | 1/2010 |
| JP | 4687728 B2 | 5/2011 |
| JP | 2012005115 A | 1/2012 |
| WO | 2009101804 A1 | 8/2009 |

* cited by examiner

Logical address

| Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Specific Use |
| 15 | Unregistered (as initiator address) Broadcast (as destination address) |

*FIG. 2*

DEVICE CONTROLLER, COMPUTER READABLE STORAGE MEDIUM, AND REMOTE CONTROL SYSTEM

CROSS REFERENCE TO RELATED APPLICATION

The contents of the following Japanese patent application and International application are incorporated herein by reference, Japanese Patent Application No. 2017-132062 filed on Jul. 5, 2017 and PCT/JP2018/016693 filed on Apr. 18, 2018.

FIELD

The present invention relates to a device controller, a remote control device, a computer readable storage medium, and a remote control system.

BACKGROUND

In recent years, remote control systems have been proposed which allow control of a plurality of devices with one remote control device (see, for example, Patent Literature 1 described below).

CITATION LIST

Patent Literature

Patent Literature 1: Japanese Patent No. 4687728

SUMMARY

Technical Problem

In a remote control system described in Patent Literature 1, a user needs to select a device that is intended to be operated by the user, and this causes complicated user operations. In such a remote control system, it is desirable that setting be automatically configured so that a device intended to be operated by a user can be controlled with a minimum operation of the user.

Therefore, an object of the present invention is to provide a remote control system which automatically configures the setting that corresponds to a device intended to be operated by a user, and to provide a device or the like that constitutes the system.

Solution to Problem

An aspect of the present invention relates to a device controller including:

a determination unit configured to determine an active device out of a first device including a plurality of ports connectable to a prescribed terminal and a second device connected to the first device through the ports; and a communication unit configured to transmit to a remote control device a control signal for allocating the active device determined by the determination unit to a device to be operated.

Another aspect of the present invention also relates to a remote control device including:

a communication unit configured to acquire remote control signals for a first device including a plurality of ports connectable to a prescribed terminal and a second device connected to the first device through the ports; and a control unit configured to configure a setting for outputting the remote control signal corresponding to an active device out of the first device and the second device in response to a control signal for allocating the active device to a device to be operated.

Another aspect of the present invention also relates to a program for causing a computer to execute a method of controlling a device, the method including:

causing a determination unit to determine an active device out of a first device including a plurality of ports connectable to a prescribed terminal and a second device connected to the first device through the ports; and causing a communication unit to transmit to a remote control device a control signal for allocating the determined active device to a device to be operated.

Another aspect of the present invention also relates to a remote control system including a device controller and a remote control device, the device controller includes a determination unit configured to determine an active device, out of a first device including a plurality of ports connectable to a prescribed terminal, and a second device connected to the first device through the ports, and a first communication unit configured to transmit to the remote control device a control signal for allocating the active device determined by the determination unit to a device to be operated, and the remote control device includes a second communication unit configured to acquire remote control signals for the first device and the second device, and a control unit configured to configure a setting for outputting the remote control signal corresponding to the active device in response to the control signal.

According to the aspect(s) of the present invention, the setting corresponding to a device intended to be operated by a user is automatically configured. It should be noted that the effects illustrated in this specification are not presented for restrictive interpretation of the content of the present invention.

BRIEF DESCRIPTION OF DRAWINGS

FIG. 2 is a diagram explaining logical addresses prescribed by an HDMI standard.

DESCRIPTION OF EMBODIMENTS

One embodiment of the present invention will be described below with reference to the drawings. The description will be given in the order shown below:
<1. One Embodiment>
<2. Modifications>

It should be noted that the embodiment and modifications described below illustrate the configuration for embodying the technical concept of the present invention and that the illustrated configuration is not intended to limit the present invention.

1. One Embodiment

[Configuration Example of Remote Control System]

Figure 1:
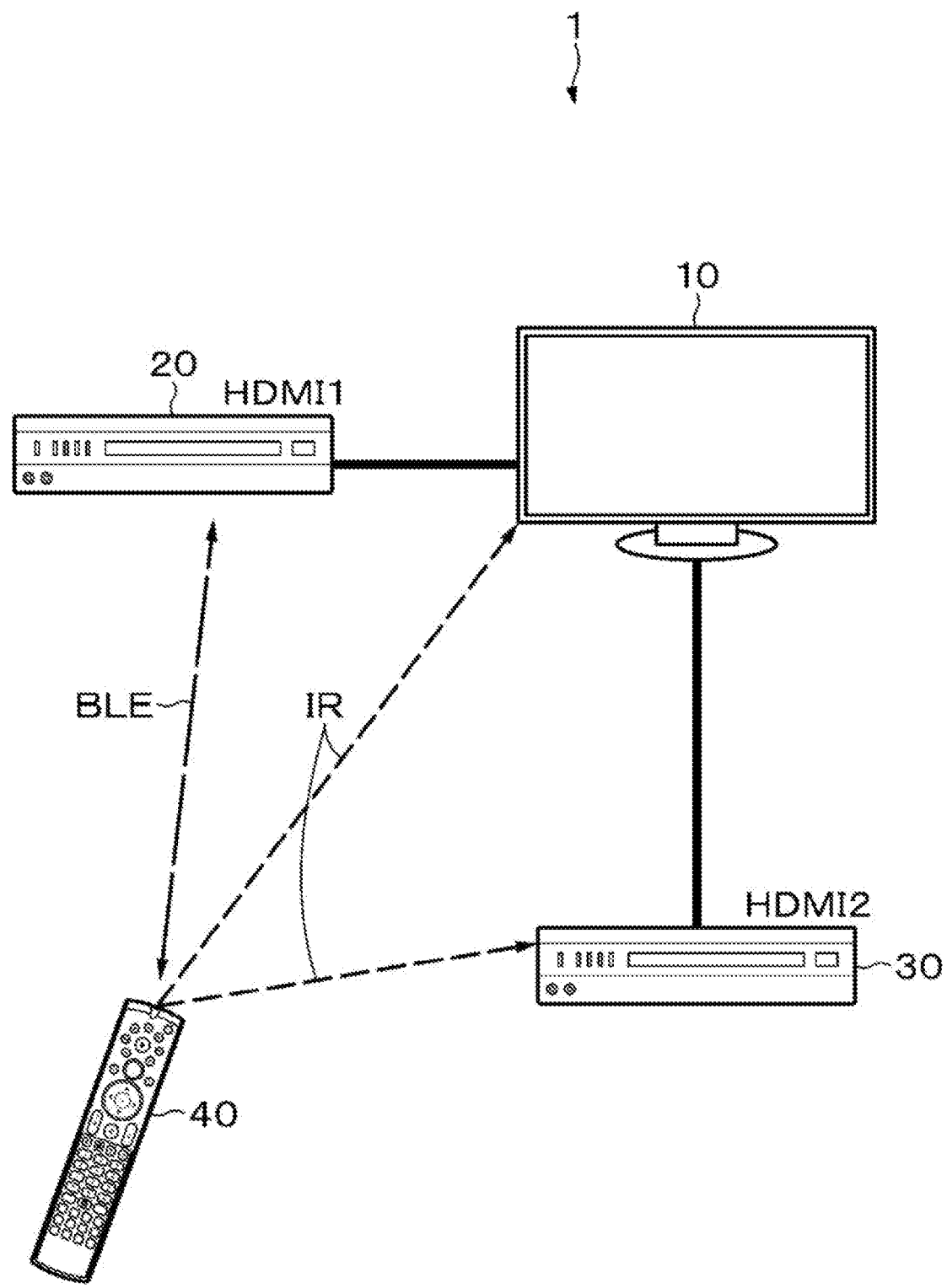
FIG. 1 is a diagram showing a configuration example of a remote control system according to one embodiment.

FIG. 1 shows a configuration example of a remote control system (remote control system 1) according to one embodiment. For example, the remote control system 1 includes a television receiver 10, a set top box (STB) 20, a video recorder 30, and a remote control device 40. The remote control device 40 transmits a remote control signal to the television receiver 10 or the like to be capable of performing remote control (remote operation) of the destination device.

The television receiver 10 as one example of the first device includes physical ports connectable to a prescribed terminal. In the present embodiment, a high-definition multimedia interface (HDMI) terminal is adopted as one example of the prescribed terminal. The television receiver 10 includes a plurality of ports connectable to the HDMI terminal. The ports are connected to the STB 20 and the video recorder 30 through cables having an HDMI terminal. For example, the ports include a port 1 (hereinafter referred to as an HDMI 1, as appropriate) which is connected to the STB 20, and a port 2 (hereinafter referred to as an HDMI 2, as appropriate) which is connected to the video recorder 30. In other words, the television receiver 10, the STB 20, and the video recorder 30 are each connected on a network based on an HDMI standard.

The STB 20 and the video recorder 30 which are connected to the television receiver 10 are examples of the second device. One of the STB 20 and the video recorder 30 operates as a device controller. In the present embodiment, the STB 20 operates as a device controller.

The remote control device 40 is capable of performing two-way communication with at least one device out of the devices present on the HDMI network. The remote control device 40 is also capable of performing one-way communication with other devices present on the HDMI network. Examples of the two-way communication may include a Bluetooth low energy (BLE) communication. Examples of the one-way communication may include an infrared ray (IR) communication. However, the communication mode of the present embodiment is not limited to these. In the present embodiment, two-way communication is performed between the STB 20 and the remote control device 40, and one-way communication is performed between the television receiver 10 and the remote control device 40, and between the video recorder 30 and the remote control device 40. In the present embodiment, the remote control device 40 belongs to the STB 20, and the STB 20 can be controlled by default with the remote control device 40.

[HDMI Standard]

Next, the outline of the HDMI standard will be described for easier understanding of the embodiment of the present invention. HDMI is a digital interface for transmission of a video signal (image signal) and a sound signal (audio signal). HDMI is an interface based on a digital visual interface (DVI) standard which is a standard for connection between a personal computer (PC) and a display, the interface having a sound transmission function and a copyright protection function added for an audio visual (AV) device.

The HDMI standard defines control between devices with use of consumer electronics control (CEC). The CEC is a transmission line provided in accordance with the HDMI standard. The CEC is used for two-way data transmission. By using the CEC line, various control can be achieved on the basis of 0 an inherent physical address and logical address which are allocated to each device present on the HDMI network. For example, when a user operates a videodisc player connected to a television receiver through an HDMI cable while viewing and listening a digital broadcast with the television receiver, the television receiver automatically switches its active input to an input connected to the videodisc player.

The HDMI standard also prescribes a logical address allocated to each device present on the HDMI network. FIG. 2 is a diagram showing a table indicating a correspondence relation between a device and a CEC logical address. A device "TV" refers to a device which displays a video image, such as a television receiver and a projector. A device "Recording Device" refers to a video recording device, such as a hard disk recorder and a DVD recorder. A device "Tuner" refers to a device which receives an AV content, such as an STB which performs reception of cable TV or the like. A device "Playback Device" refers to a reproduction device, such as a video player and a camcorder. A device "Audio System" refers to an audio processor, such as an AV amplifier. When a device is recognized as one of the CEC compliant devices corresponding to one of the logical addresses allocated to the devices present on the HDMI network, it becomes possible to operate the recognized CEC compliant device. The following description will be made on the assumption that the devices in the present embodiment are CEC compliant devices.

In an HDMI-CEC standard, a message <Active Source> is prescribed as a CEC message for specifying a device that is displaying an image on the television receiver. According to the prescription, when, for example, a user operates a reproduction button of a videodisc player compliant with the HDMI standard, and the videodisc player itself is in the state (i.e., an active state) capable of outputting a stable video signal, the videodisc player outputs an AV stream. The videodisc player also broadcasts a message <Active Source> indicating that the videodisc player is an active device.

Here, the term "broadcast" signifies transmission of a broadcast signal to all the devices instead of a specific device. The television receiver and other external devices which receive the broadcasted message <Active Source> perform route switchover for reproducing the AV stream output from the video player.

Thus, the HDMI-CEC standard prescribes that the device which starts display of a video image on the television receiver broadcasts a message <Active Source> to other devices in the network. The message <Active Source> is one of the CEC messages defined by the HDMI standard. This completes the outline of the HDMI standard.

[Television Receiver]

(Configuration Example of Television Receiver)

Figure 3:
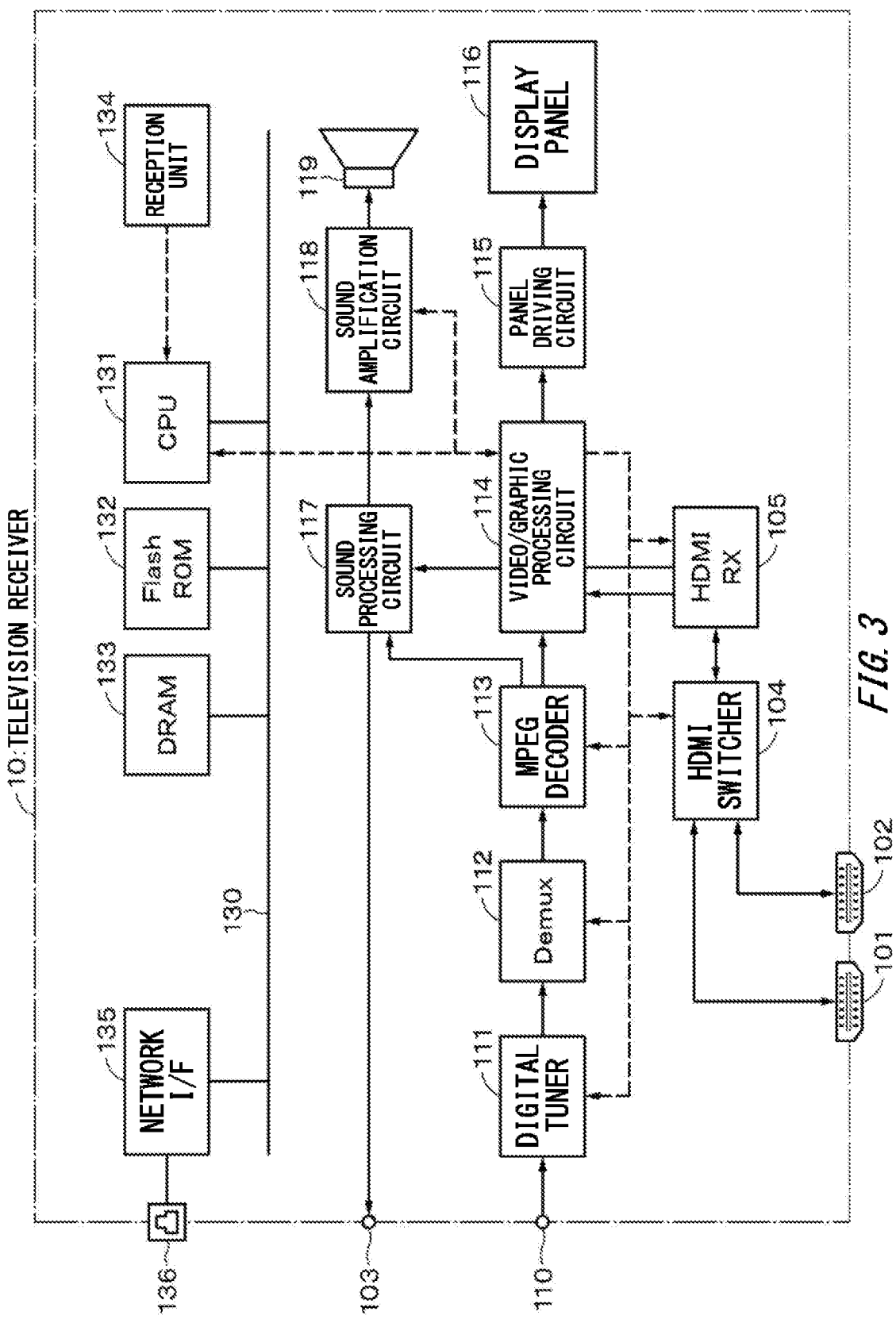
FIG. 3 is a block diagram showing a configuration example of a television receiver according to one embodiment.

FIG. 3 is a block diagram showing a configuration example of the television receiver 10. The television receiver 10 includes HDMI terminals 101 and 102, an HDMI switcher 104, an HDMI reception unit 105, an antenna terminal 110, and a digital tuner 111. The television receiver 10 also includes a demultiplexer (Demux) 112, a moving picture expert group (MPEG) decoder 113, a video/graphic processing circuit 114, a panel driving circuit 115, and a display panel 116. The television receiver 10 further includes a sound processing circuit 117, a sound amplification circuit 118, and a loudspeaker 119. Furthermore, the television receiver 10 includes an internal bus 130, a central processing unit (CPU) 131, a flash ROM 132, a DRAM 133, a reception unit 134, a network I/F 135, and a network terminal 136.

The CPU 131 controls operation of each unit of the television receiver 10. The flash ROM 132 stores control software, and saves data. The DRAM 133 forms a work area, or the like, of the CPU 131. The CPU 131 expands on the DRAM 133 the software and data read from the flash ROM 132, starts up the software, and controls each unit of the television receiver 10. The CPU 131, the flash ROM 132, and the DRAM 133 are connected to the internal bus 130.

The reception unit 134 receives, for example, an infrared remote control signal transmitted from the remote control device 40, and supplies the received signal to the CPU 131. A user can operate the television receiver 10 and other CEC compliant devices, which are connected to the television receiver 10 through an HDMI cable, by operating the remote control device 40.

The network I/F 135 connects with the network through a network cable connected to the network terminal 136, and executes data exchange with various devices connected to the network.

The antenna terminal 110 is a terminal to which a television broadcasting signal received with the receiving antenna (not illustrated) is input. The digital tuner 111 processes the television broadcasting signal input into the antenna terminal 110, and outputs a prescribed transport stream corresponding to a channel selected by the user. The demultiplexer 112 extracts from the transport stream obtained by the digital tuner 111 a partial transport stream (TS) (TS packets of video data, and TS packets of audio data) corresponding to the channel selected by the user.

The demultiplexer 112 also extracts program specific information/service information (PSI/SI) from the transport stream obtained by the digital tuner 111, and outputs the extracted PSI/SI to the CPU 131. The transport stream obtained by the digital tuner 111 is formed by multiplexing a plurality of channels. The demultiplexer 112 can perform the processing of extracting the partial TS of an arbitrary channel from the transport stream by obtaining information on a packet ID (PID) of the channel from the PSI/SI (PAT/PMT).

The MPEG decoder 113 applies decode processing to video packetized elementary stream (PES) packets formed of the TS packets of the video data obtained by the demultiplexer 112, and thereby obtains video data. The MPEG decoder 113 applies decode processing to audio PES packets formed of the TS packets of the audio data obtained by the demultiplexer 112, and thereby obtains audio data.

The video/graphic processing circuit 114 applies processing such as scaling processing and graphic data superimposition processing to the video data obtained by the MPEG decoder 113 as necessary. The video/graphic processing circuit 114 also generates image data by the processing based on an application prestored in the flash ROM 132, and outputs the generated image data to the panel driving circuit 115. The panel driving circuit 115 drives the display panel 116 on the basis of the video data output from the video/graphic processing circuit 114. For example, the display panel 116 is made up of a liquid crystal display (LCD), an organic electroluminescent (EL) display, or the like.

The sound processing circuit 117 applies necessary processing such as D/A conversion to the audio data obtained by the MPEG decoder 113. The sound amplification circuit 118 amplifies an analog audio signal output from the sound processing circuit 117, and supplies the amplified signal to the loudspeaker 119. The sound processing circuit 117 also converts the audio data obtained by the MPEG decoder 113 to a digital optical signal, and outputs the converted signal to an optical output terminal 103.

The HDMI switcher 104 selectively connects the HDMI terminals 101 and 102 to the HDMI reception unit 105. The HDMI reception unit 105 is selectively connected to one of the HDMI terminals 101 and 102 through the HDMI switcher 104. Through communication in compliance with HDMI, the HDMI reception unit 105 receives video data and audio data transmitted from external devices (also referred to as source devices or repeater devices in the HDMI standard) connected to the HDMI terminal 101 or 102. Through the CEC lines of the HDMI terminal 101 or 102, commands in compliance with CEC (hereinafter referred to as CEC control commands, as appropriate) are exchanged.

(Operation Example of Television Receiver)

Here, an operation example of the television receiver 10 shown in FIG. 3 will briefly be described. A television broadcasting signal input into the antenna terminal 110 is supplied to the digital tuner 111. The digital tuner 111 processes the television broadcasting signal to provide a transport stream corresponding to the channel selected by the user. The transport stream is supplied to the demultiplexer 112. The demultiplexer 112 extracts from the transport stream a partial TS (TS packets of video data, and TS packets of audio data) corresponding to the channel selected by the user. The extracted partial TS is supplied to the MPEG decoder 113.

The MPEG decoder 113 applies decode processing to the video PES packets formed of the TS packets of video data, and thereby obtains video data. The obtained video data is subjected to processing such as scaling processing and graphic data superimposition processing in the video/graphic processing circuit 114 as necessary, and is then supplied to the panel driving circuit 115. Accordingly, an image corresponding to the channel selected by the user is displayed on the display panel 116.

The MPEG decoder 113 also applies decode processing to audio PES packets formed of the TS packets of the audio data, and thereby obtains audio data. The obtained audio data is subjected to necessary processing such as D/A conversion in the sound processing circuit 117, and is further amplified in the sound amplification circuit 118. The audio signal is then supplied to the loudspeaker 119. Accordingly, the loudspeaker 119 outputs the audio signal corresponding to the channel selected by the user.

The audio data obtained by the MPEG decoder 113 is converted into, for example, a digital optical signal in an S/PDIF standard in the sound processing circuit 117, and is then output to the optical output terminal 103. Accordingly, the television receiver 10 can transmit the audio data to an external device through the optical cable.

The HDMI reception unit 105 can obtain video data and audio data input into the HDMI terminals 101 and 102 through the HDMI cables. The video data is supplied to the video/graphic processing circuit 114. The audio data is supplied to the sound processing circuit 117. Subsequent operation is similar to the operation at the time of receiving the television broadcasting signal described before. That is, an image is displayed on the display panel 116, and an audio signal is output from the loudspeaker 119.

In the remote control system 1 shown in FIG. 1, in the case of, for example, viewing and listening an image and an audio signal based on the video data and audio data from the video recorder 30, the user views and listens the image and audio signal based on the video data and audio data acquired by the HDMI reception unit 105 as described before.

[STB]
(Configuration Example of STB)

Figure 4:
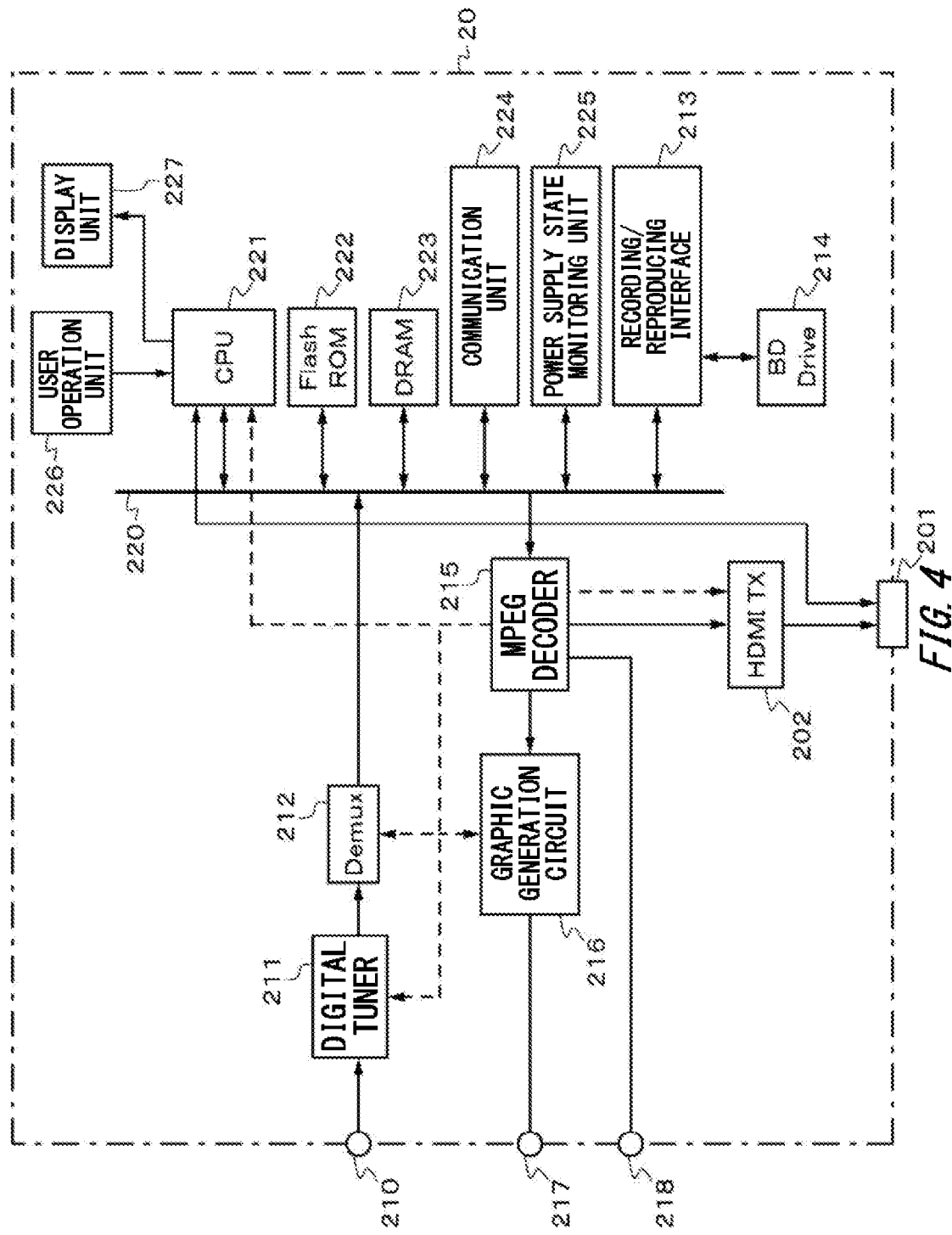
FIG. 4 is a block diagram showing a configuration example of an STB according to one embodiment.

FIG. 4 shows one example of the configuration of the STB 20. For example, the STB 20 includes an HDMI terminal 201, an HDMI transmission unit 202, a terminal 210, a digital tuner 211, a demultiplexer 212, a recording/reproducing interface 213, a Blu-ray disc (BD) drive 214, an MPEG decoder 215, a graphic generation circuit 216, a video output terminal 217, a sound output terminal 218, an internal bus 220, a CPU 221 serving as one example of the determination unit, a flash ROM 222, a DRAM 223, a communication unit 224, a power supply state monitoring unit 225, a user operation unit 226, and a display unit 227.

The CPU 221 controls operation of each unit of the STB 20. Furthermore, the CPU 221 appropriately generates various kinds of commands defined by CEC in the HDMI standard, and outputs the generated commands through the CEC line of the HDMI terminal 201. The CPU 221 further interprets the contents of the commands input through the CEC line of the HDMI terminal 201.

The flash ROM 222 stores software executed by the CPU 221, and saves data. The DRAM 223 is used as a work area, or the like, of the CPU 221. The CPU 221 expands on the DRAM 223 the software and data read from the flash ROM 222, starts up the software, and controls each unit of the STB 20.

The communication unit 224 performs two-way communication with the remote control device 40. The communication unit 224 includes an antenna, a modulation and demodulation circuit, and an error correction circuit. The power supply state monitoring unit 225 monitors a state of the power supplies of the devices connected on the HDMI network such as the television receiver 10. The CPU 221, the flash ROM 222, the DRAM 223, the communication unit 224, the power supply state monitoring unit 225, the demultiplexer 212, and the recording/reproducing interface 213 are connected to the internal bus 220.

The CPU 221 is connected to the user operation unit 226 and the display unit 227. For example, the user operation unit 226 and the display unit 227 constitute a user interface. The user operation unit 226 allows the user to control the operation of the STB 20. The user operation unit 226 is formed of elements such as keys, buttons, dials, or a remote control transmitter receiver arranged on an unillustrated casing of the STB 20. The display unit 227 displays an operation state of the STB 20, a user operating state, or the like. The display unit 227 is formed of an LCD, an organic EL display, or the like.

The terminal 210 is a terminal to which the television broadcasting signal, or the like, transmitted through a prescribed cable, is input for example. The digital tuner 211 processes the television broadcasting signal input into the terminal 210, and outputs a prescribed transport stream. The demultiplexer 212 extracts from the transport stream obtained by the digital tuner 211 a partial TS (TS packets of video data, and TS packets of sound data) corresponding to a prescribed selected channel.

The demultiplexer 212 extracts PSI/SI from the transport stream obtained by the digital tuner 211, and outputs the extracted PSI/SI to the CPU 221. The transport stream obtained by the digital tuner 211 is formed by multiplexing a plurality of channels. The demultiplexer 212 can perform the processing of extracting from the transport stream the partial TS of an arbitrary channel by obtaining information on the packet ID (PID) of the channel from the PSI/SI (PAT/PMT).

The BD drive 214 is connected to the internal bus 220 through the recording/reproducing interface 213. The BD drive 214 records the partial TS extracted by the demultiplexer 212 on a disk at the time of recording. The BD drive 214 also reproduces the partial TS recorded on the disk at the time of reproduction.

The MPEG decoder 215 applies decode processing to the video PES packets constituting the partial TS which is extracted by the demultiplexer 212 or reproduced by the BD drive 214, and thereby obtains video data. The MPEG decoder 215 applies decode processing to audio PES packets constituting the partial TS, and thereby obtains sound data.

The graphic generation circuit 216 applies processing such as graphic data superimposition processing to the video data obtained by the MPEG decoder 215 as necessary. The video output terminal 217 outputs the video data output from the graphic generation circuit 216. The sound output terminal 218 outputs the sound data obtained by the MPEG decoder 215.

Through communication in compliance with HDMI, the HDMI transmission unit (HDMI source) 202 sends out from the HDMI terminal 201 baseband video and sound data obtained by the MPEG decoder 215.

The DRAM 223 (storage unit) according to the present embodiment stores IR data for each device. As described later in detail, the STB 20 transmits to the remote control device 40 the IR data corresponding to each of the devices connected on the HDMI network. The IR data may be stored in the STB 20 in advance. Alternatively, the STB 20 may be connectable to the network, so that the IR data may be downloaded via the network and be stored in the DRAM 223. The IR data refers to the data that each corresponding device can interpret the content thereof. Off course, different IR data may be generated for different operation contents.

(Operation Example of STB)

An operation example of the STB 20 will briefly be described. A television broadcasting signal input into the terminal 210 is supplied to the digital tuner 211. The digital tuner 211 processes the television broadcasting signal to extract a prescribed transport stream. The extracted transport stream is supplied to the demultiplexer 212. The demultiplexer 212 extracts from the transport stream a partial TS (TS packets of video data, and TS packets of sound data) corresponding to a prescribed channel. The partial TS is supplied to the BD drive 214 through the recording/reproducing interface 213, and is recorded on the basis of a recording instruction output from the CPU 221.

The partial TS extracted by the demultiplexer 212 or the partial TS reproduced by the BD drive 214 is supplied to the MPEG decoder 215. The MPEG decoder 215 applies decode processing to the video PES packets formed of the TS packets of video data, and thereby obtains video data. The obtained video data is subjected to processing such as graphic data superimposition processing in the graphic generation circuit 216, and is then supplied to the video output terminal 217. The MPEG decoder 215 further applies decode processing to the audio PES packets formed of the TS packets of sound data, and thereby obtains sound data. The obtained sound data is output to the sound output terminal 218.

Baseband video and sound data obtained by the processing in the MPEG decoder 215 is supplied to the HDMI transmission unit 202, and is sent out from the HDMI transmission unit 202 to an external device through the HDMI terminal 201.

The STB 20 may include a hard disk, and the hard disk may be configured to record the video data and sound data. The video data and sound data recorded on the hard disk may be reproduced, and be sent out to an external device through the HDMI terminal 201.

The configuration example of the STB 20 described above is also applicable to the video recorder 30. Naturally, the STB 20 and the video recorder 30 may have a constitutional difference therebetween. The number of the HDMI terminals included in the STB 20 may be changed, as appropriate, and the STB 20 does not need to have a recording system for recording data on a disk.

[Remote Control Device]
(Example of External Appearance of Remote Control Device)

Figure 5:
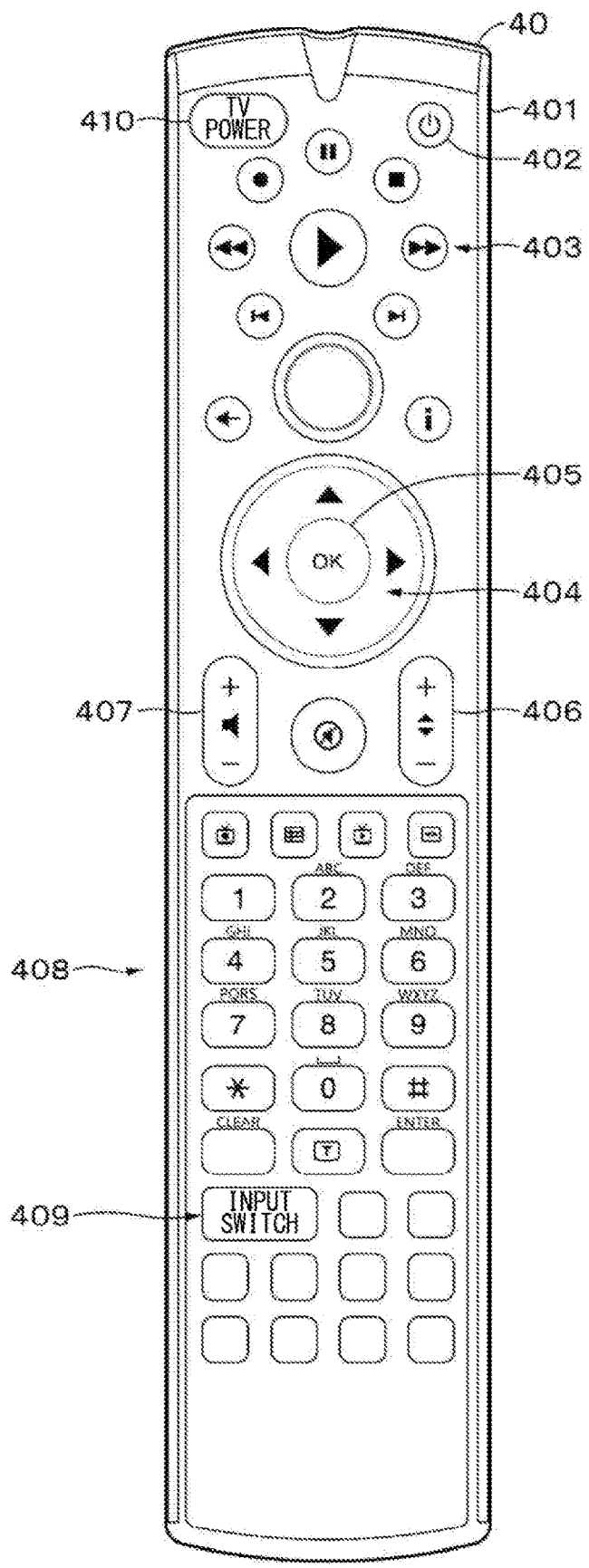
FIG. 5 is a diagram showing an example of the external appearance of a remote control device according to one embodiment.

FIG. 5 shows one example of the external appearance of the configuration of the remote control device 40. The remote control device 40 has a slightly thin plate-like casing 401 which has a rectangular shape as viewed from the top. The casing 401 has a principal surface which is provided with a plurality of buttons (a button group).

The button group provided on the casing 401 will briefly be described. The button group includes a power ON/OFF button 402, operation buttons 403 used for operation such as reproduction and stop of AV devices, a direction button 404, a determination button 405, a channel up/down button 406, a volume up/down button 407, number buttons 408, an input switch button 409, and a TV power button 410 for turning on or off the power supply of the television receiver 10.

(Configuration Example of Remote Control Device)

Figure 6:
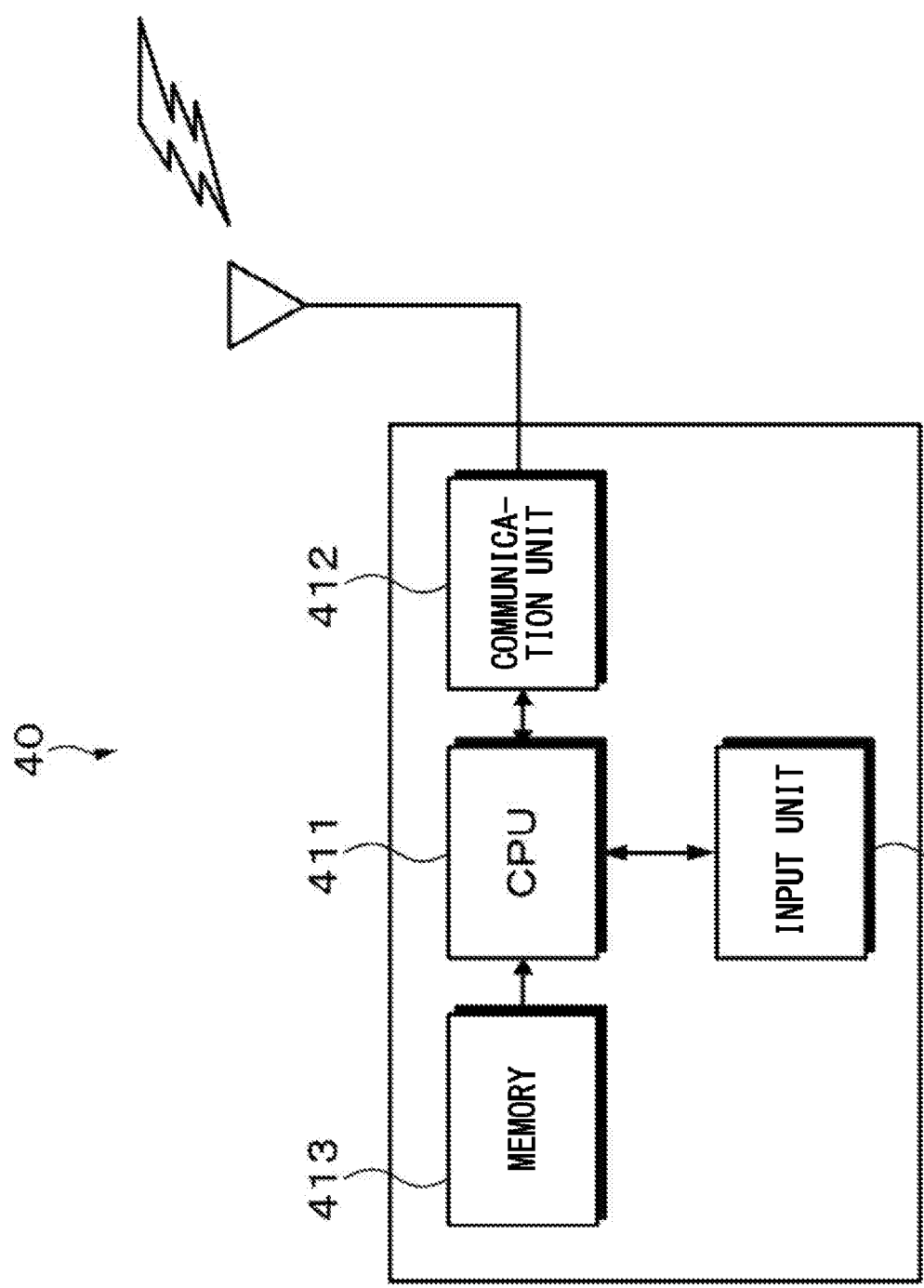
FIG. 6 is a block diagram showing a configuration example of the remote control device according to one embodiment.

FIG. 6 is a block diagram showing a configuration example of the remote control device 40. The remote control device 40 includes: a CPU 411, a communication unit 412 including an antenna, a memory 413, and an input unit 414.

The CPU 411 controls each unit of the remote control device 40. The communication unit 412 is a generic name referring to the configuration (including a modulation and demodulation circuit, an error correction circuit, and the like) used for communication. Specifically, the communication unit 412 has the configuration for performing two-way communication with the STB 20, and the configuration for performing one-way communication with each of the television receiver 10 and the video recorder 30. The memory 413 is a generic name referring to the ROM which stores a program executed by the CPU 411, the RAM used as a work area when the CPU 411 executes the program, and other memory devices. The memory 413 stores the IR data transmitted from the STB 20. The input unit 414 has the configuration corresponding to the button group described above. In response to an operation to the input unit 414, a corresponding manipulate signal is generated, and the manipulate signal is supplied to the CPU 411. The CPU 411 executes control corresponding to the manipulate signal.

"IR Data Download Processing"

A description will be given of IR data download processing executed in the remote control system 1. In the IR data download processing, the remote control device 40 downloads from the STB 20 the IR data used for controlling the devices connected on the HDMI network.

Figure 7:
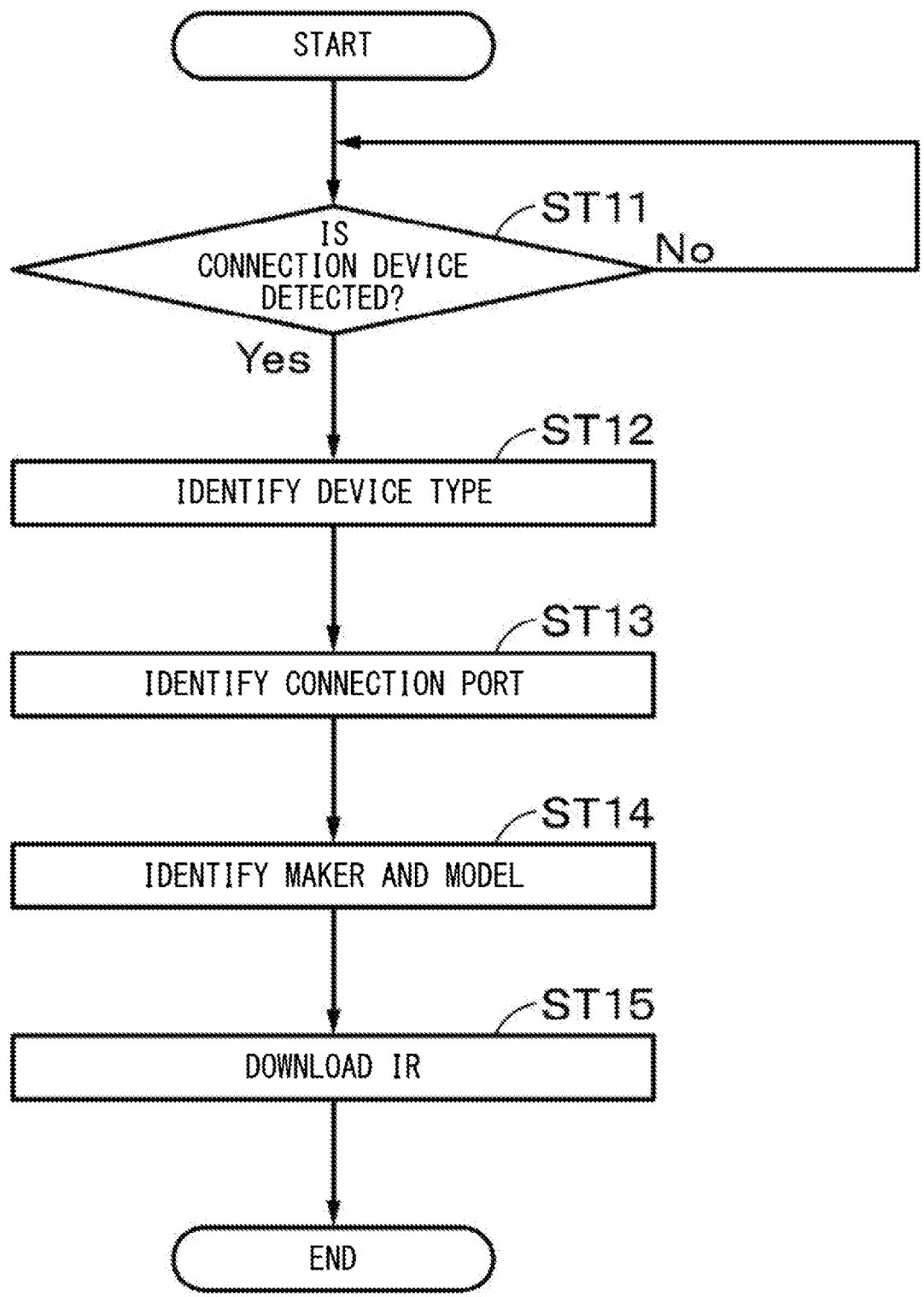
FIG. 7 is a flowchart showing the flow of IR data download processing according to one embodiment.

FIG. 7 is a flowchart showing the flow of the IR data download processing according to the embodiment. The IR data download processing is performed mainly by the STB 20 at the time when, for example, a new device is connected on the HDMI network. The IR data download processing may also be performed at the time when the STB 20 is started up.

In step ST11, it is detected whether a new device (hereinafter referred to as a connection device, as appropriate) is connected on the HDMI network. Here, when no connection device is connected on the HDMI network, the processing returns to step ST11. When the connection device is connected on the HDMI network, the processing proceeds to step ST12.

In step ST12, processing of identifying a type (device type) of the connection device is performed. Then, the processing proceeds to step ST13.

In step ST13, processing of identifying a port (connection port) connected to the connection device is performed. Then, the processing proceeds to step ST14.

In step ST14, processing of identifying a manufacturer (maker) and a model of the connection device is performed. Then, the processing proceeds to step ST15.

In step ST15, the STB 20 reads the IR data corresponding to the maker and the model identified in step ST14, and transmits the read IR data to the remote control device 40. Accordingly, the remote control device 40 downloads the IR data corresponding to the connection device.

(Acquisition of Logical Address)

A specific example of each processing will be described. First, a description will be given of an example where a device connected on the HDMI network acquires its own logical address. Described below are an example where the HDMI 1 of the television receiver 10 (having a physical address [0000] and a CEC logical address {0}) is connected to the STB 20, and an example where the HDMI 2 is connected to the video recorder 30.

Figure 8:
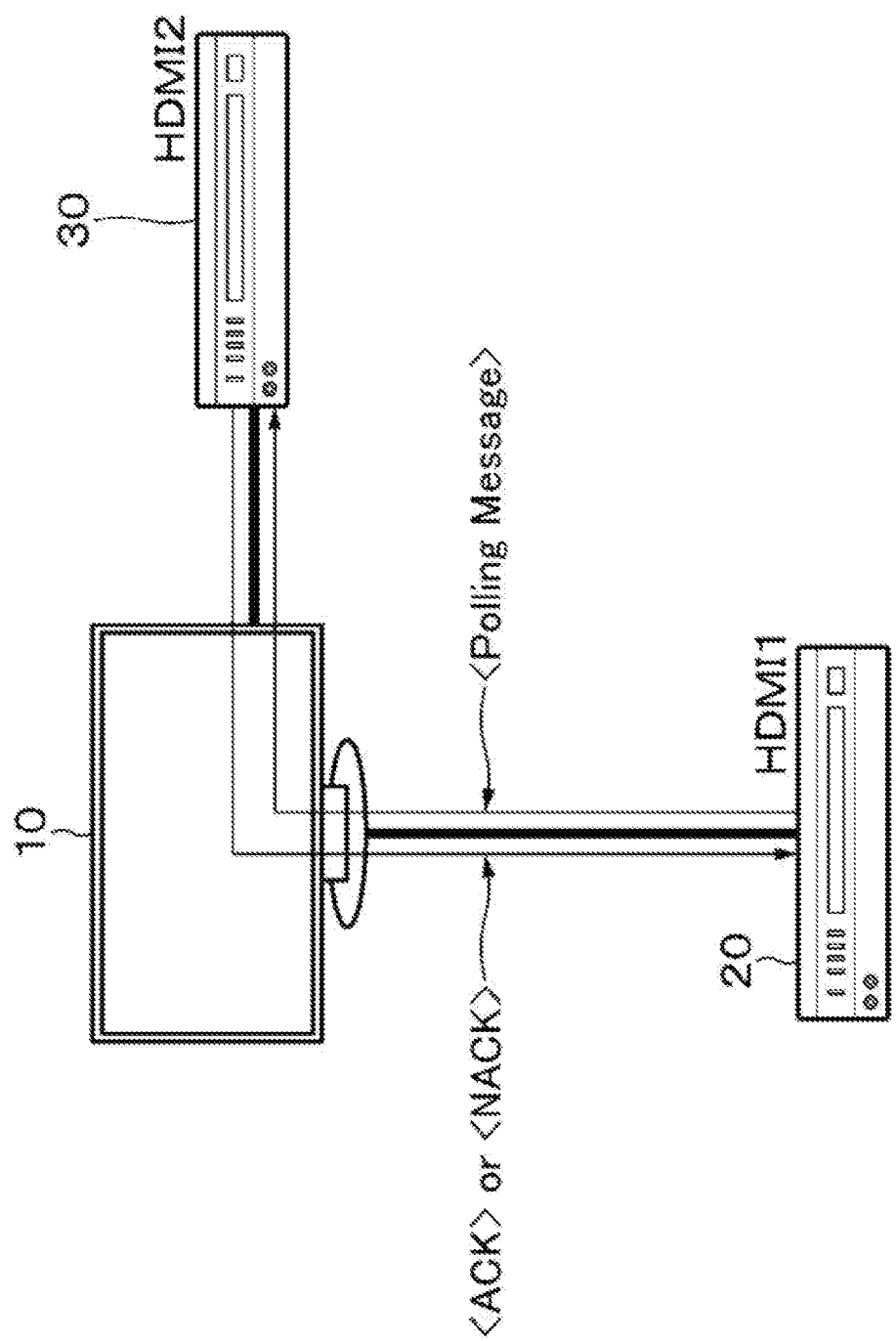
FIG. 8 is a diagram explaining processing in which a device connected on an HDMI network acquires a device type.

When the STB 20 is connected on the HDMI network, the STB 20 transmits <Polling Message> which is one of the CEC control commands to other devices as shown in FIG. 8 to confirm that a device with a logical address {3} (see FIG. 2) is not present. When it is confirmed that the device with the logical address {3} is not present with reference to a response <ACK> or <NACK> to <Polling Message>, the STB 20 sets the logical address {3} as its own logical address. If the device with the logical address {3} is present, then the STB 20 confirms whether, for example, a device with a logical address {6} is present with use of <Polling Message>.

The same processing applies to the video recorder 30. The video recorder 30 transmits <Polling Message> to other devices so as to confirm that the device with a logical address {1} (see FIG. 2) is not present. When it is confirmed that the device with the logical address {1} is not present with reference to a response <ACK> or <NACK> to <Polling Message>, the video recorder 30 sets the logical address {1} as its own logical address. In the present embodiment, the STB 20 acquires the logical address {3}, and the video recorder 30 acquires the logical address {1}. The video recorder 30 acquires from the television receiver 10 a physical address [2000] that corresponds to the HDMI 2 connected to the video recorder 30 itself by using an HDMI control protocol.

(Identification of Connection Port)

A description will next be given of the processing in which the STB 20 identifies the ports connected to the respective devices. Since the processing in which the STB 20 identifies the port connected to the STB 20 itself is different in content from the processing in which the STB 20 identifies the port connected to the video recorder 30, these processing contents will be described separately.

Figure 9A:
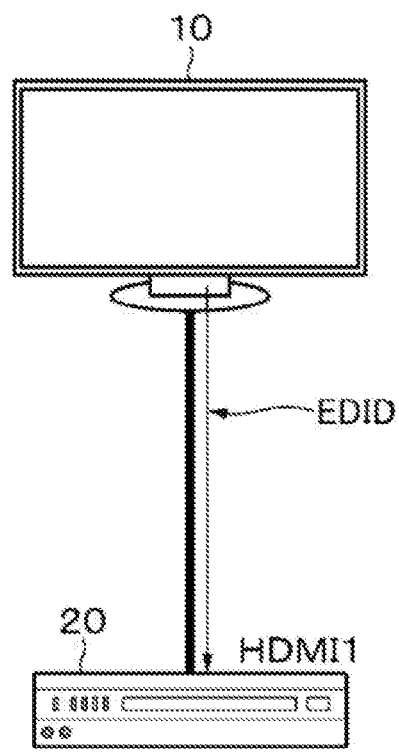
FIG. 9A is a diagram explaining processing for identifying ports connected to respective devices.

First, a description will be given of the processing in which the STB 20 identifies the port connected to the STB 20 itself. As shown in FIG. 9A, the STB 20 acquires extended display identification data (EDID) from the television receiver 10. The CPU 221 of the STB 20 analyzes the content of the EDID to acquire a CEC address. In the present embodiment, the physical address [1000] is acquired as a physical address corresponding to the HDMI 1.

Figure 9B:
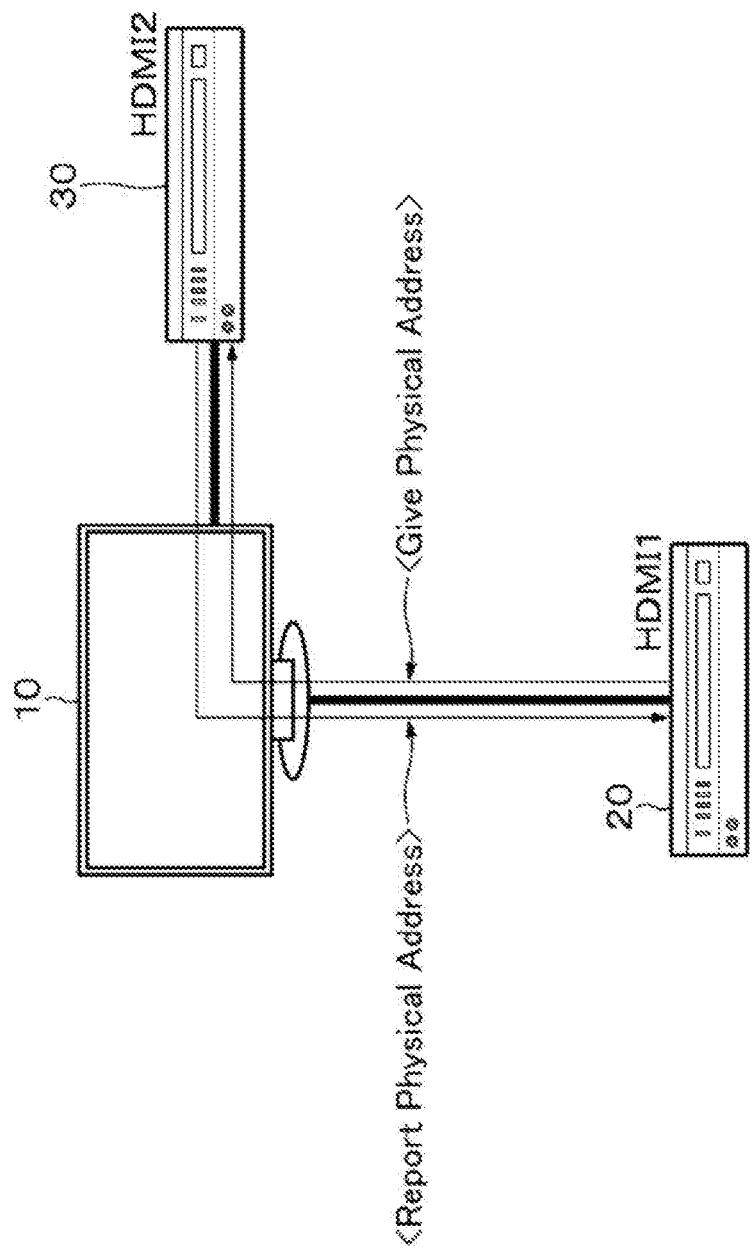
FIG. 9B is a diagram explaining processing for identifying ports connected to respective devices.

A description will be given of the processing in which the STB 20 identifies the port connected to the video recorder 30. As shown in FIG. 9B, the STB 20 issues (transmits) <Give Physical Address>, which is one of the CEC control commands, to the video recorder 30. Upon reception of <Give Physical Address>, the video recorder 30 issues <Report Physical Address>, which is one of the CEC control commands, to the STB 20 as a response to the command <Give Physical Address>.

The command <Report Physical Address> includes a description of a port number and a device type. In the present embodiment, ([2000], {1}) is described in <Report Physical Address> as a physical address and a device type of the video recorder 30. In other words, upon reception of <Report Physical Address>, the STB 20 can recognize that the video recorder is connected to the HDMI 2.

(Processing of Identifying Maker and Model, and IR Data Downloading)

Next, a description will be given of the processing in which the STB 20 identifies the manufacturers and models of the television receiver 10 and the video recorder 30 connected to the television receiver 10. Since the television receiver 10 is different in processing content from the video recorder 30, respective processing contents will be described separately.

Figure 10A:
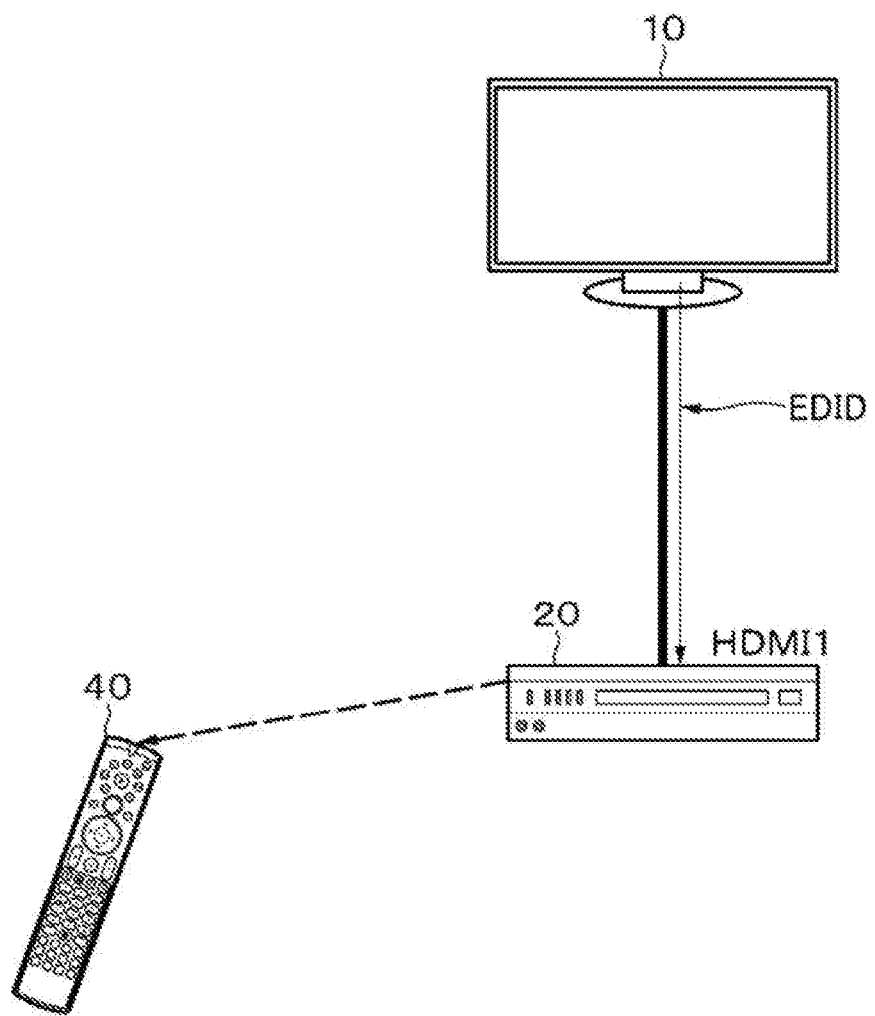
FIG. 10A is a diagram explaining processing for identifying manufacturers and models of the devices connected on the HDMI network.
Figure 10B:
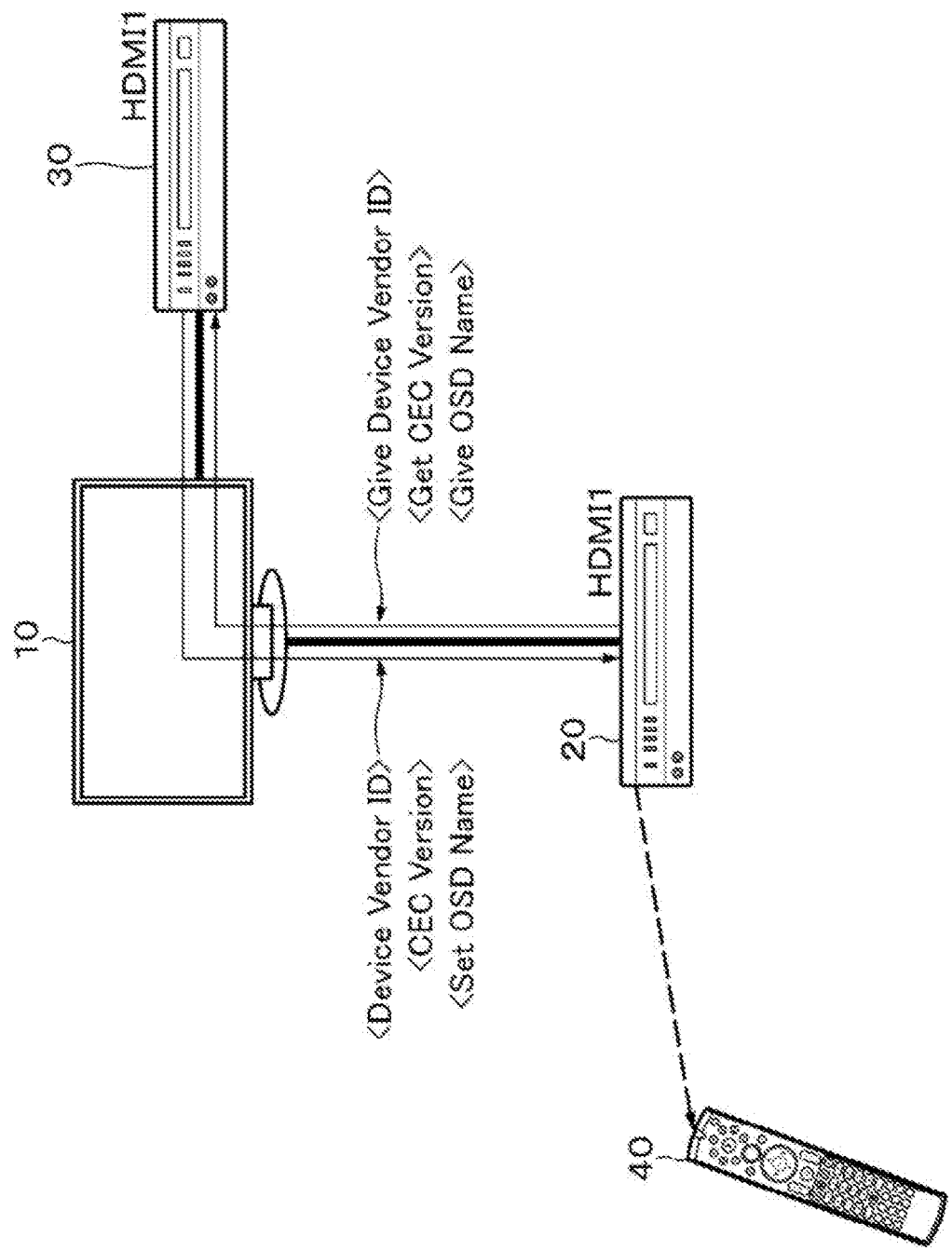
FIG. 10B is a diagram explaining processing for identifying manufacturers and models of the devices connected on the HDMI network.

First, a description will be given of the processing in which the STB 20 identifies the maker and model of the television receiver 10. As shown in FIG. 10A, the STB 20 acquires the EDID from the television receiver 10. When the CPU 221 of the STB 20 analyzes the content of the EDID, the maker and a model name of the television receiver 10 are identified. For example, the maker name is identified from the manufacturer ID included in the EDID, and the model is identified from other information. When there is no information indicating the model itself, the CPU 221 estimates the model with reference to the year of manufacture or the like.

The CPU 221 of the STB 20 which has identified the maker and model of the television receiver 10 reads from the DRAM 223 the IR data corresponding to the television receiver 10. The CPU 221 then controls the communication unit 224 to transmit the read IR data to the remote control device 40. The remote control device 40 receives the IR data transmitted from the STB 20 with the communication unit 412. The received IR data is stored in the memory 413 in accordance with control of the CPU 411. Specifically, the IR data is associated with the information (maker and model name) indicating the television receiver 10, and is stored in the memory 413.

Next, a description will be given of the processing in which the STB 20 identifies the maker and model of the video recorder 30. The STB 20 issues to the video recorder 30 CEC control commands for acquiring the information on the maker or the like. Examples of the CEC control commands may include <Give Device Vendor ID>, <Get CEC Version>, and <Give OSD Name>. In the present embodiment, all the commands are transmitted to the video recorder 30 from the STB 20.

The video recorder 30 issues CEC control commands such as <Device Vendor ID>, <CEC Version>, and <Set OSD Name> as a response to the STB 20. The CPU 221 of the STB 20 interprets these commands so as to identify the maker and model name of the video recorder 30. For example, the CPU 221 identifies the maker on the basis of <Device Vendor ID>, and identifies the model on the basis of <CEC Version> and <Set OSD Name>, or the like.

The CPU 221 of the STB 20 which has identified the maker and model of the video recorder 30 reads from DRAM 223 the IR data corresponding to the video recorder 30. The CPU 221 then controls the communication unit 224 to transmit the read IR data to the remote control device 40. The remote control device 40 receives the IR data transmitted from the STB 20 with the communication unit 412. The received IR data is stored in the memory 413 in accordance with control of the CPU 411. Specifically, the IR data is associated with the information (maker and model name) corresponding to the video recorder 30, and is stored in the memory 413.

With the IR data download processing described above, the remote control device 40 can acquire the IR data for controlling each device connected on the HDMI network. The contents of the respective processes in the IR data download processing are merely illustrative. It is also possible to apply publicly-known processes different from the processes described above.

[Remote Control Device Setting Processing]

Next, the remote control device setting processing will be described. The outline of the remote control device setting processing will be described. When the remote control device 40 is operated, an active device, that is, a device connected to an input of the television receiver 10 is switched. The STB 20 determines a new active device after switchover. The STB 20 then transmits to the remote control device 40 a control signal for allocating the determined active device to a device to be operated. In response to the control signal, the remote control device 40 reads the IR data corresponding to the active device, and configures the setting for outputting the IR data in accordance with an operation. Thus, the user can perform remote operation of the active device by using the remote control device 40, without any labor of configuring the setting relating to the active device after switchover.

Hereinafter, a description will be given on the basis of specific examples. Since the remote control device setting processing when the power supply of the television receiver 10 is turned on is different in processing content from the setting processing when the power supply of the television receiver 10 is turned off, the respective processing contents will be described separately. The power supply state of the television receiver 10 is monitored by the power supply state monitoring unit 225 of the STB 20. More specifically, the power supply state monitoring unit 225 of the STB 20 periodically issues, for example, <Give Device Power> which is one of the CEC control commands, to the television receiver 10, and monitors the power supply state of the television receiver 10 on the basis of a response command thereto.

Figure 11:
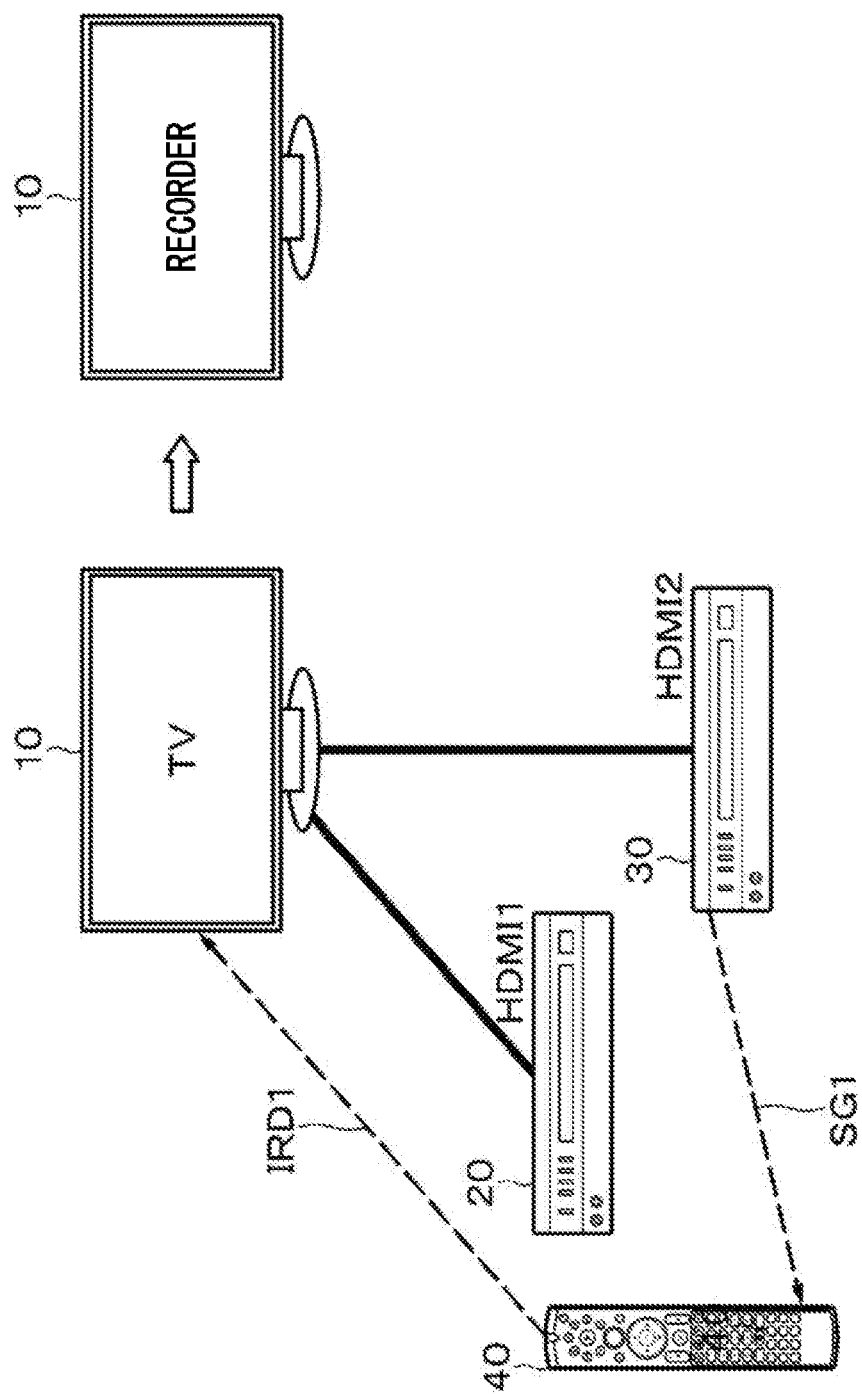
FIG. 11 is a diagram explaining processing for identifying an active device.

First, the remote control device setting processing when the power supply state of the television receiver 10 is an ON state will be described with reference to FIG. 11. The power supply state monitoring unit 225 of the STB 20 recognizes that the power supply of the television receiver 10 is in the ON state. In this state, the television broadcasting obtained through the tuner of television receiver 10 is set as an input of the television receiver 10. Next, the input switch button 409 of the remote control device 40 is pressed. In response to the operation, IR data IRD1 for switching the input is transmitted from the remote control device 40 to the television receiver 10. Upon reception of the IR data IRD1, the HDMI switcher 104 of the television receiver 10 switches the HDMI terminals. With this operation, the input of the television receiver 10 is switched from the television broadcasting to the input from the video recorder 30, for example.

In response to the input switchover, the television receiver 10 transmits to the devices connected on the HDMI network one of the CEC control commands <Active Source> and <Routing Change> by broadcasting. The CPU 221 of the STB 20 receives the command transmitted from the television receiver 10 through the HDMI terminal 201, and determines a next active device after switchover with reference to the command.

Described below is an example of the relation between commands that the STB 20 receives and ports connected to the devices determined as an active device on the basis of the commands. (1) Case where the command that the STB 20 receives is <Active Source: 0F 82 0000> . . . In this case, the CPU 221 of the STB 20 determines that the device with a physical address [0000], i.e., the television receiver 10, is the active device.

(2) Case where the command that the STB 20 receives is <Routing Change 0F 80 xx xx 1000> . . . In this case, the CPU 221 of the STB 20 determines that the device connected to the HDMI (device with a physical address [1000]), i.e., the STB 20, is the active device.

(3) Case where the command that the STB 20 receives is <Routing Change 0F 80 xx xx 2000> . . . In this case, the CPU 221 of the STB 20 determines that the device connected to the HDMI (device with a physical address [2000]), i.e., the video recorder 30, is the active device.

In this example, since the input of the television receiver 10 is switched from the television broadcasting to the input from the video recorder 30, the STB 20 receives <Routing Change 0F 80 xx xx 2000>.

With reference to the received command, the CPU 221 of the STB 20 determines a next active device after switchover (the video recorder 30 in this example) as described above. Then, the CPU 221 transmits to the remote control device 40 a control signal SG1, which is for allocating the video recorder 30 to the device to be operated, with the communication unit 224. The control signal SG1 is for identifying the video recorder 30. For example, the control signal SG1 indicates a maker, a model name, or the like, of the video recorder 30.

The communication unit 412 of the remote control device 40 receives the control signal SG1. The CPU 411 of the remote control device 40 which has received the control signal SG1 configures the setting for allocating the video recorder 30 to the device to be operated. For example, the CPU 411 reads the IR data corresponding to the video recorder 30 from the memory 413. In response to a subsequent operation, the CPU 411 transmits the IR data from the communication unit 412. The processing contents corresponding to the buttons provided on the remote control device 40 may be changed to the contents corresponding to the video recorder 30. When the arrangement of the button group is highly flexible, as in the case where the button group is formed of a touch panel, the arrangement and the content of the button group may be changed to a button group corresponding to the video recorder 30.

When the active device is switched to the video recorder 30, the remote control device setting processing described in the foregoing enables the setting of the remote control device 40 to be automatically changed to the setting corresponding to the video recorder 30. This makes it possible to achieve the user-friendly remote control system 1, which eliminates the necessity of the user configuring the setting.

The remote control device 40 further retains (stores) remote control signals (IR data in this example) for the television receiver 10 and the video recorder 30 in advance. Therefore, the STB 20 only needs to transmit to the remote control device 40 only the control signals relating to the next active device after switchover. Since the amount of information of the control signals is smaller than those of the IR data itself, communication delay can be minimized, while power consumption can be reduced.

Figure 12:
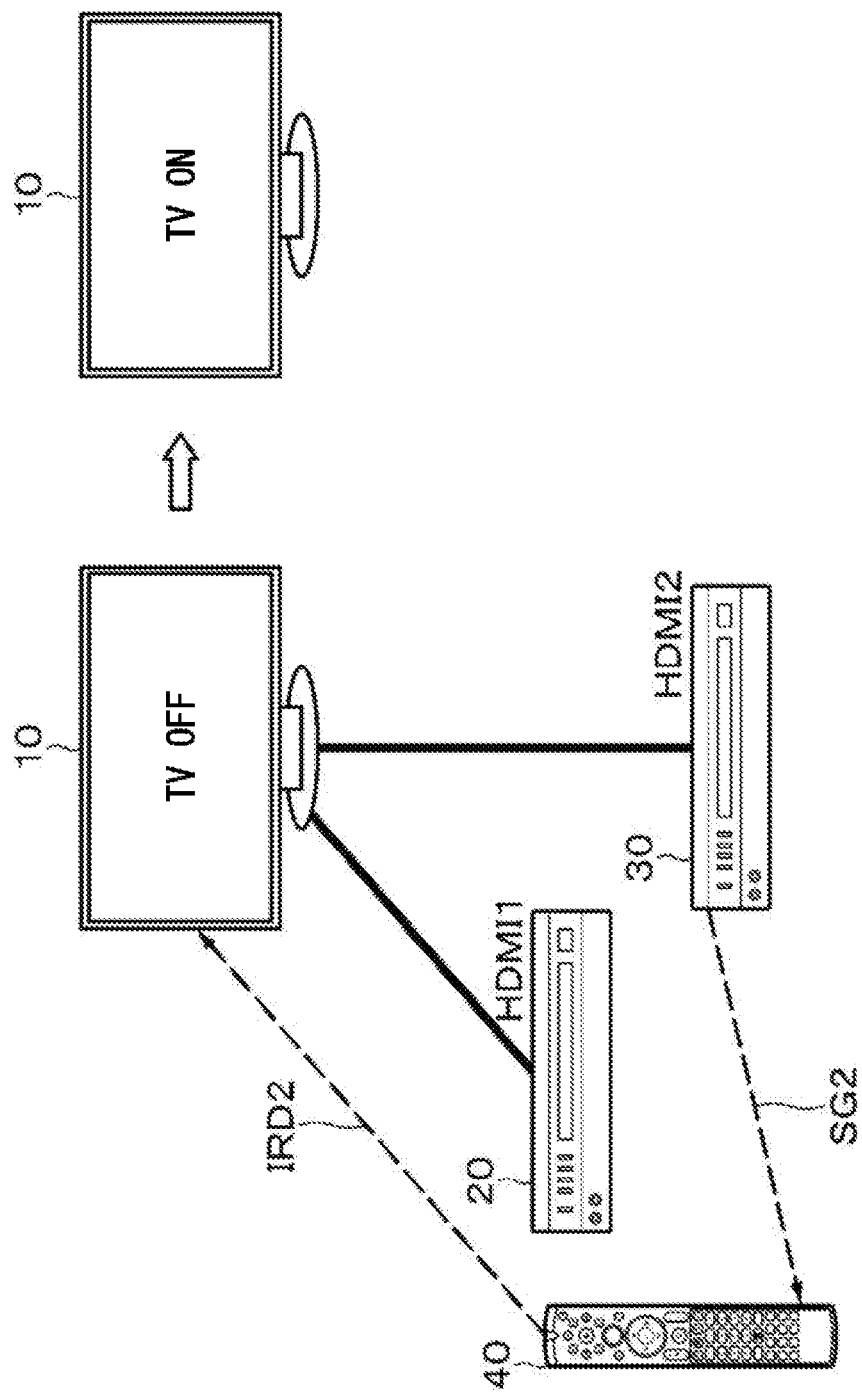
FIG. 12 is a diagram explaining processing for identifying the active device.

Next, a description will be given, with reference to FIG. 12, of the remote control device setting processing when the power supply state of the television receiver 10 is an OFF state. The power supply state monitoring unit 225 of the STB 20 recognizes that the power supply of the television receiver 10 is in the OFF state. As described before, the STB 20 can monitor the power supply state of the television receiver 10 on the basis of a response command to <Give Device Power>.

Next, the TV power button 410 is pressed for turning on the television receiver 10 of the remote control device 40. Since the remote control device 40 has downloaded the IR data corresponding to the television receiver 10 in advance, the remote control device 40 can generate IR data IRD2 for turning on the television receiver 10 in response to an operation performed on the TV power button 410. The remote control device 40 transmits the generated IR data IRD2 to the television receiver 10. Upon reception of the IR data IRD2, the CPU 131 of the television receiver 10 performs control for supplying electric power to each unit of the television receiver 10. Accordingly, the television receiver 10 changes from the OFF state to the ON state, and television broadcasting is displayed on the display panel 116. It should be noted that the television receiver 10 does not issue <Active Source>, when the power supply of the television receiver 10 changes from OFF to ON.

The STB 20 recognizes that the television receiver 10 changes from the OFF state to the ON state. When the STB 20 does not receive <Active Source> (first command) nor <Routing Change> (second command) for a prescribed time (about several seconds to one minute, for example) after the power supply of the television receiver 10 has been turned on, the STB 20 determines that the active device (input) is the television receiver 10. Here, when, for example, the input switch button 409 is pressed within a prescribed time and the STB 20 receives <Active Source> and <<Routing Change>, the STB 20 interprets the content of the command, and determines a next active device after switchover as in the above-described example.

With reference to the presence of a received command, and the content of the command if the command has been received, the CPU 221 of the STB 20 determines a next active device after switchover. Then, the CPU 221 transmits, to the remote control device 40 through the communication unit 224, a control signal SG2 for allocating the determined active device to the device to be operated. The control signal SG2 is for identifying the active device.

The communication unit 412 of the remote control device 40 receives the control signal SG2. Upon reception of the control signal SG2, the CPU 411 of the remote control device 40 configures the setting for allocating the active device indicated by the control signal SG2 to the device to be operated. For example, the CPU 411 reads the IR data corresponding to the active device from the memory 413. In response to a subsequent operation, the CPU 411 transmits the IR data from the communication unit 412. When the device to be operated, which is set by the remote control device 40, is identical to the device indicated by the control signal SG2, the existing setting is continuously used.

When the active device is switched, the remote control device setting processing described in the foregoing enables the remote control device 40 to automatically configure the setting corresponding to a next active device.

2. Modifications

Although one embodiment of the present invention has specifically been described, the present invention is not limited to the embodiment described above, and various kinds of modifications are possible.

First Modification

Figure 13:
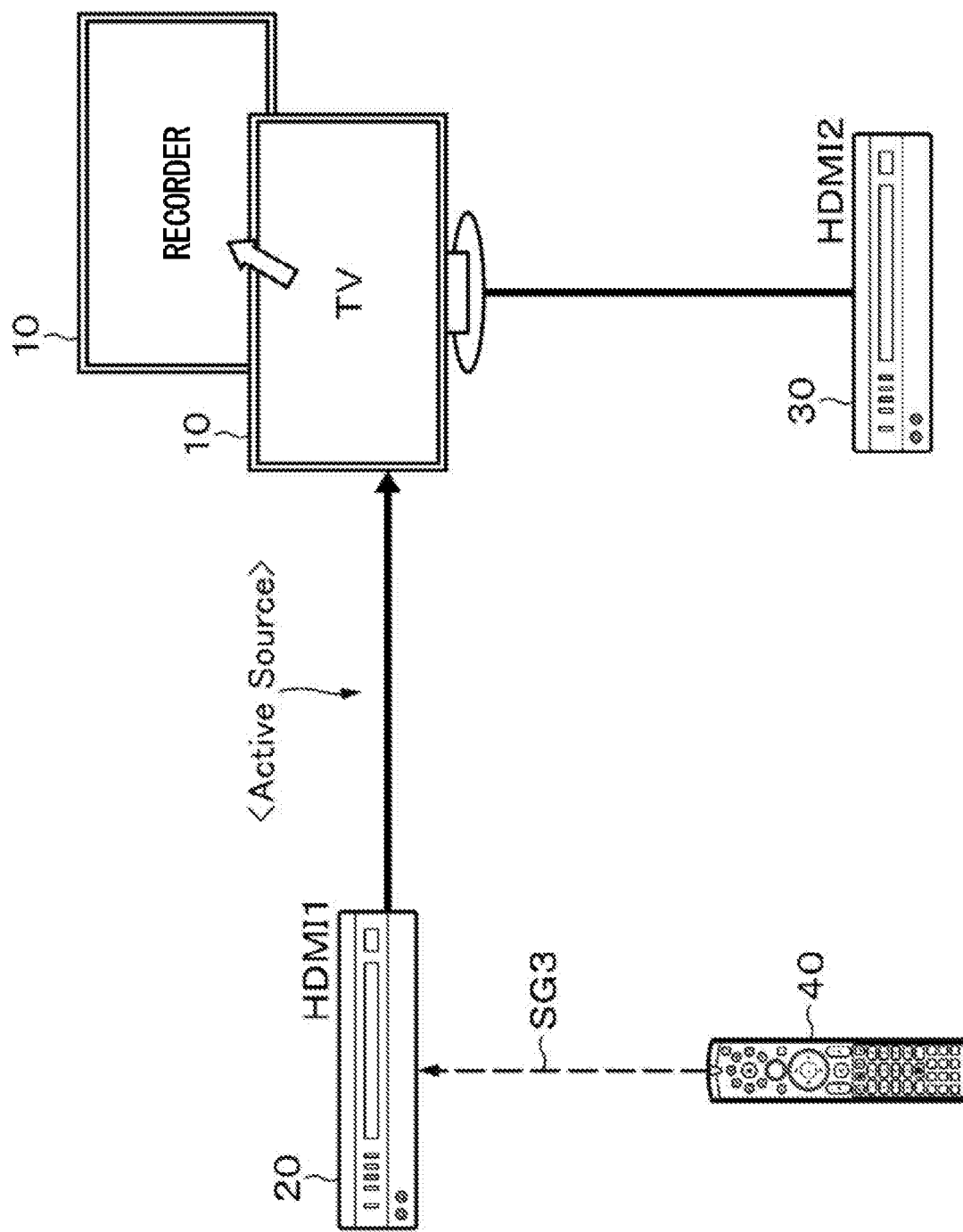
FIG. 13 is a diagram explaining a modification.

In the embodiment described above, the remote control device 40 may include buttons corresponding to devices (such as a television receiver, a VCR, and an STB). When any one of the buttons is pressed, the device corresponding to the pressed button may be selected as an input of that device by this one operation. A specific description will be given with reference to FIGS. 13 and 14. For example, assume the case where television broadcasting is selected as an input of the television receiver 10 as shown in FIG. 13. Assume that a button corresponding to the video recorder is pressed on the remote control device 40 in this state. A control signal SG3 corresponding to the pressing operation is transmitted through BLE communication from the remote control device 40 to the STB 20. The control signal SG3 is a key that is compliant with the BLE standard.

The STB 20 receives the control signal SG3. As described in the embodiment above, the STB 20 recognizes the physical address (for example, a physical address [2000] corresponding to the HDMI 2) of the video recorder 30. Accordingly, the STB 20 outputs to the television receiver 10 a command (for example, <Active Source 2000>) which notifies that the device of the pertinent physical address outputs a content. Thus, the input of the television receiver 10 is switched to the input from the video recorder 30. In other words, the user can switch the input of the television receiver 10 to a desired input by only one operation of pressing the button corresponding to the video recorder provided on the remote control device 40 (without pressing the input switch button 409 a plurality of times).

Figure 14:
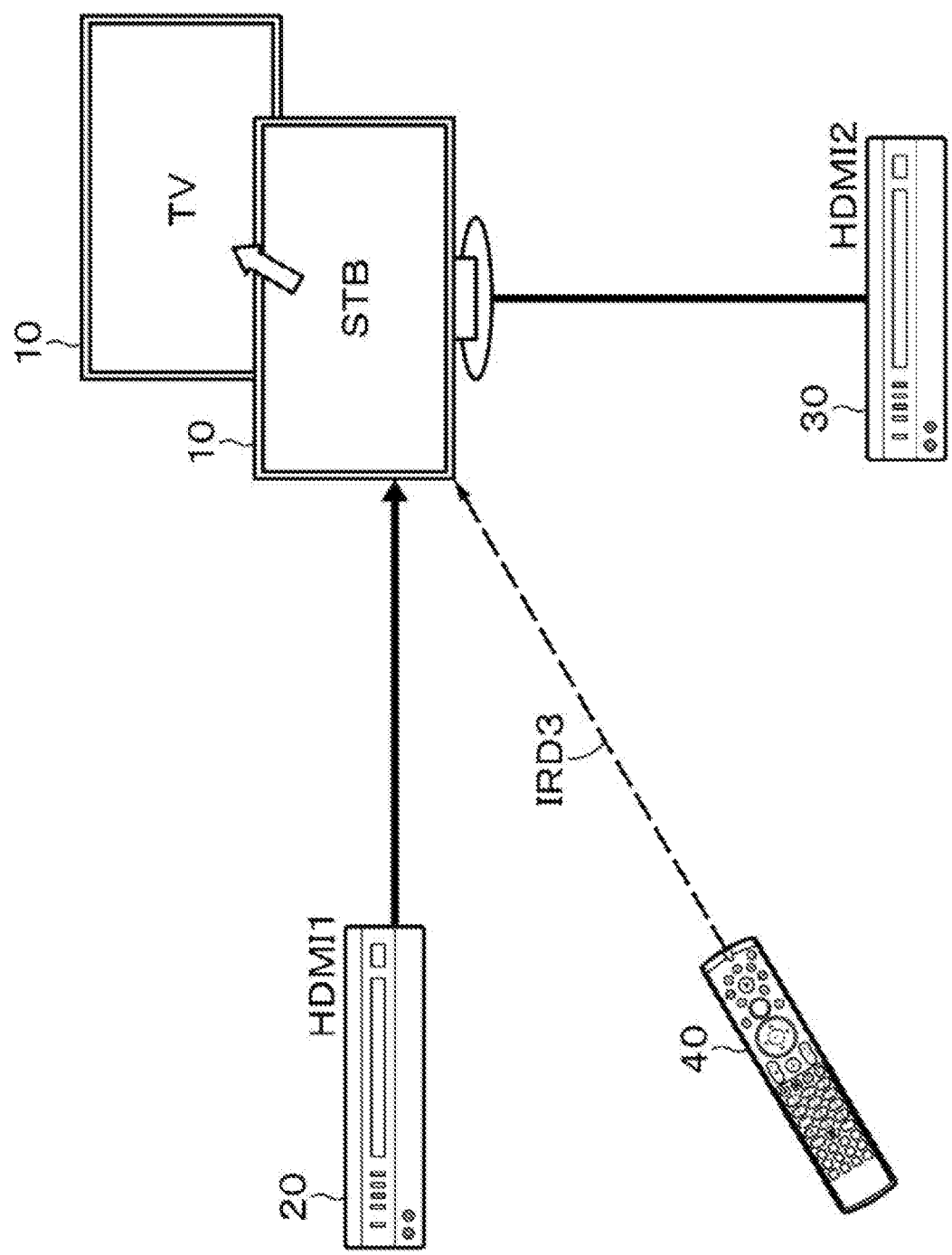
FIG. 14 is a diagram explaining a modification.

As shown in FIG. 14, when, for example, the remote control device 40 includes a button corresponding to terrestrial digital broadcasting and the user presses the button, the remote control device 40 transmits IR data IRD3 corresponding to the pressing operation to the television receiver 10. Upon reception of the IR data IRD3, the television receiver 10 switches the input of the television receiver 10 from, for example, the input of the STB 20 to the terrestrial television broadcasting obtained through the digital tuner 111 of the television receiver 10.

Second Modification

Figure 15:
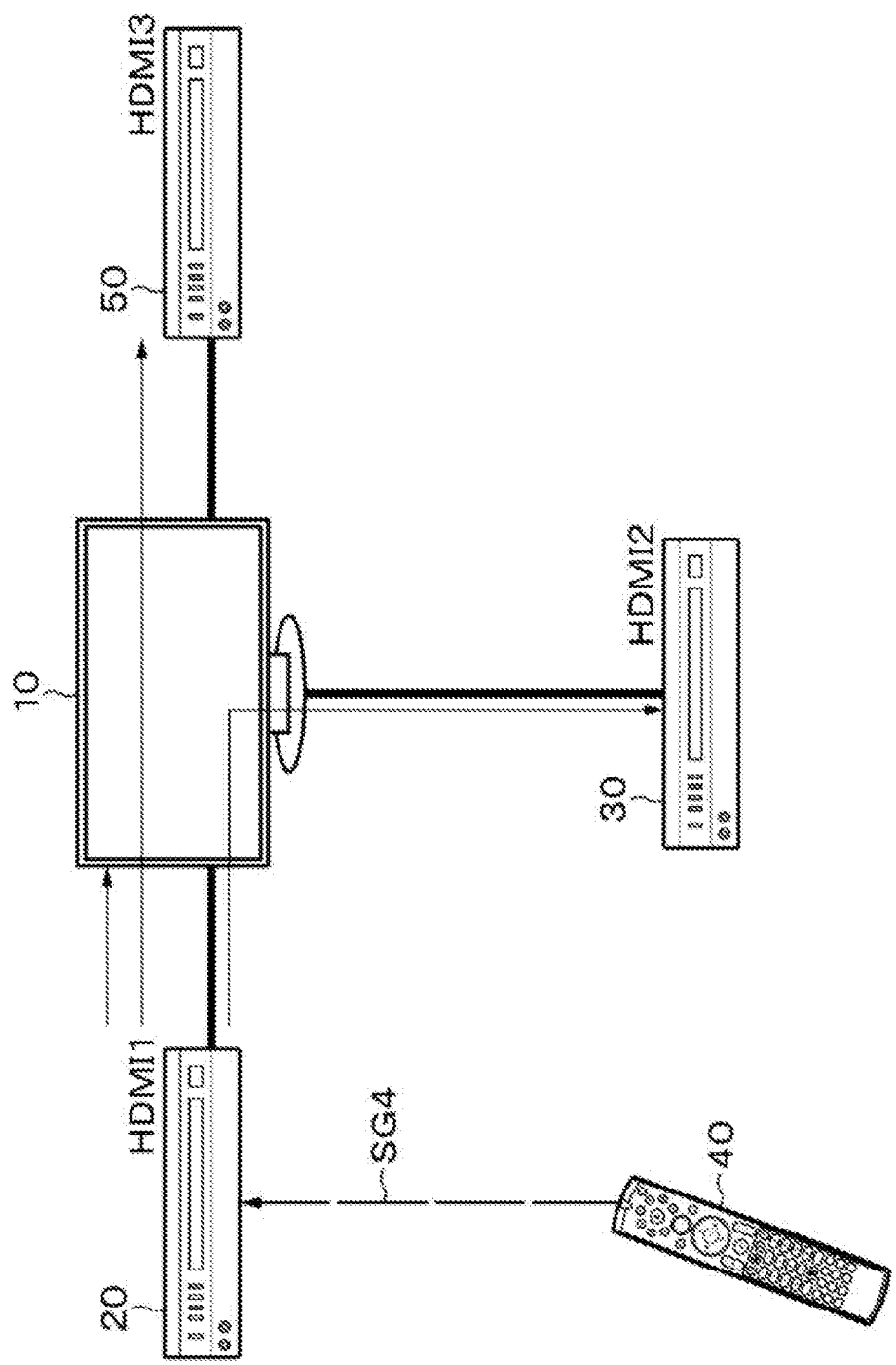
FIG. 15 is a diagram explaining a modification.

In the embodiment described above, it may also be assumed that the STB 20 does not have the IR data corresponding to a device connected on the HDMI network. For example, as shown in FIG. 15, assume that a tuner 50 (one example of the third device) is connected as an HDMI 3 to the television receiver 10. The tuner 50 is a CEC compliant device. When the tuner 50 is a latest device, the STB 20 may not have IR data corresponding to the tuner 50. In this case, the STB 20 outputs to the remote control device 40 an error signal indicating that the IR data corresponding to the tuner 50 is not present.

When an operation is performed on the remote control device 40 after the STB 20 has transmitted the error signal, the remote control device 40 transmits a key SG4 based on the BLE communication to the STB 20. Upon reception of the key SG4, the STB 20 converts the key SG4 into a CEC control command (one example of the device control signal), transmits the CEC control command to the television receiver 10, the video recorder 30, and the tuner 50 so as to control the respective devices. With this control, when a device whose the IR data cannot be identified is connected to the HDMI network, switching the mode of remote control allows operation of the tuner 50 or the like with the remote control device 40.

Other Modifications

Other modifications will be described. In the embodiment described above, the devices connected on the HDMI network may not necessarily be the devices that output contents. For example, the devices may be small terminals (communication adapters) or the like, which are connectable with the HDMI terminals and which do not output contents. A device other than the STB 20 may operate as a device controller. The number and types of the devices which constitute the HDMI network are not limited to those illustrated in the aforementioned embodiment. In the embodiment described above, the devices are connected through HDMI cables, i.e., through cable connection. However, the devices may be connected wirelessly.

As described in the embodiment, the remote control device 40 can recognize the current active device on the basis of the control signal transmitted from the STB 20. Accordingly, the remote control device 40 may present information corresponding to the active device. For example, when the active device is the television receiver 10, recommended programs may be presented. When the active device is the video recorder 30, recommended rental movies and the like may be presented. The remote control device 40 may acquire these pieces of information from the STB 20 or the like, or the remote control device 40 itself may acquire these pieces of information through the Internet and the like. The presentation of the information may be achieved by displaying it on the remote control device 40, or may be achieved by voice. The method of presentation is not limited to a particular method.

In the embodiment described above, the STB 20 may put the devices (inactive devices), which are not active, in a standby state with use of a CEC control command, and may turn off the power supply of the inactive devices.

In the embodiment described above, in addition to the remote control device 40, another remote control device may also be used. In this case, when an input is switched by the another remote control device, the processing similar to the processing described in the embodiment may also be performed.

The configurations, methods, steps, shapes, materials, values, and the like, mentioned in the aforementioned embodiment and modifications are merely examples. Different configurations, methods, steps, shapes, materials, values, and the like may also be used as necessary. It is also possible to replace these with publicly-known configurations, methods, steps, shapes, materials, values, and the like. The configurations, methods, steps, shapes, materials, values, and the like, mentioned in the aforementioned embodiment and modifications may also be combined with each other without departing from the range of technically consistency. The present invention may be implemented in proper forms such as a device, a method, a program, and a system.

REFERENCE SIGNS LIST

1 . . . Remote control system
10 . . . Television receiver
20 . . . STB
30 . . . Video recorder
40 . . . Remote control device
50 . . . Tuner
101, 102 . . . HDMI terminal
221 . . . CPU
223 . . . DRAM
224 . . . Communication unit
225 . . . Power supply state monitoring unit

The invention claimed is:

1. A device controller comprising:
a transmission unit configured to interface the device controller with an HDMI network including a plurality of HDMI-capable devices;
a determination unit configured to determine by polling on the HDMI network an active device out of the plurality of HDMI-capable devices, the plurality of HDMI-capable devices comprising a first device including a plurality of ports connectable to a prescribed terminal and a second device connected to the first device through at least one of the plurality of ports;
a communication unit configured to transmit to a remote control device a control signal for activating the active device determined by the determination unit as being a device to be operated; and
a storage unit configured to store IR data for operating the first device and the second device,
wherein, when IR data corresponding to a third device connected to the first device via the at least one of the plurality of ports is not stored in the storage unit, the communication unit transmits an error signal to the remote control device,
when an operation is performed on the remote control device after the error signal has been received, the remote control device transmits a key via BLUETOOTH to the communication unit, and
upon receipt of the key, the device controller converts the key into a CEC control command, and transmits the CEC control command to the third device.

2. The device controller according to claim 1, wherein the communication unit transmits the control signal to the remote control device that retains in advance IR data for operating the first device and the second device.

3. The device controller according to claim 2, wherein the control signal is a signal for identifying the active device.

4. The device controller according to claim 1, wherein the device controller is capable of performing two-way communication with the remote control device.

5. The device controller according to claim 1, wherein, when a power supply of the first device is an ON state and the active device is switched, the determination unit determines an active device after switchover with reference to the command output from the first device.

6. The device controller according to claim 5, comprising a power supply state monitoring unit configured to monitor a state of a power supply of the first device.

7. The device controller according to claim 1, wherein, when a power supply of the first device changes from an OFF state to an ON state, if a first command and a second command are not received from the first device for a prescribed time, the determination unit determines that the active device is the first device, and if the second command is received within the prescribed time, the determination unit determines an active device with reference to a content of the second command.

8. The device controller according to claim 1, wherein the prescribed terminal is an HDMI terminal.

9. The device controller according to claim 1, wherein the device controller is a device corresponding to the second device.

10. A non-transitory computer readable storage medium storing a program which causes a computer to execute a method of controlling a device, the method comprising:
causing a transmission unit to interface a device controller with an HDMI network including a plurality of HDMI-capable devices;
causing a determination unit to determine by polling on the HDMI network an active device out of the plurality of HDMI-capable devices, the plurality of HDMI-capable devices comprising a first device including a plurality of ports connectable to a prescribed terminal and a second device connected to the first device through at least one of the plurality of ports;
causing a communication unit to transmit to a remote control device a control signal for activating the determined active device as being a device to be operated;
causing a storage unit to store IR data for operating the first device and the second device; and
when IR data corresponding to a third device connected to the first device via the at least one of the plurality of ports is not stored in the storage unit, causing the communication unit to transmit an error signal to the remote control device,
when an operation is performed on the remote control device after the error signal has been received, transmitting a key from the remote control device via BLUETOOTH to the communication unit,
upon receipt of the key, converting the key into a CEC control command, and
transmitting the CEC control command to the third device.

11. A remote control system comprising a device controller and a remote control device, wherein
the device controller includes a transmission unit configured to interface the device controller with an HDMI network including a plurality of HDMI-capable devices;

a determination unit configured to determine by polling on the HDMI network an active device out of the plurality of HDMI-capable devices, the plurality of HDMI-capable devices comprising a first device including a plurality of ports connectable to a prescribed terminal and a second device connected to the first device through at least one of the plurality of ports, a first communication unit configured to transmit to the remote control device a control signal for activating the active device determined by the determination unit as being a device to be operated, and a storage unit configured to store IR data for operating the first device and the second device, wherein, when IR data corresponding to a third device connected to the first device via the at least one of the plurality of ports is not stored in the storage unit, the first communication unit transmits an error signal to the remote control device, when an operation is performed on the remote control device after the error signal has been received, the remote control device transmits a key via BLUETOOTH to the communication unit, and upon receipt of the key, the device controller converts the key into a CEC control command, and transmits the CEC control command to the third device, and the remote control device includes a second communication unit configured to acquire IR data for the first device and the second device, and a control unit configured to configure a setting for outputting the IR data corresponding to the active device in response to the control signal.

* * * * *